(12) United States Patent
Kim

(10) Patent No.: US 9,661,375 B2
(45) Date of Patent: May 23, 2017

(54) DISPLAY APPARATUS AND METHOD OF CONTROLLING CONTENT OUTPUT OF DISPLAY APPARATUS

(71) Applicant: SAMSUNG ELECTRONICS CO., LTD., Suwon-si, Gyeonggi-do (KR)

(72) Inventor: Min-ji Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/933,209

(22) Filed: Nov. 5, 2015

(65) Prior Publication Data
US 2016/0182945 A1 Jun. 23, 2016

(30) Foreign Application Priority Data

Dec. 18, 2014 (KR) .......................... 10-2014-0183302

(51) Int. Cl.
*H04N 21/436* (2011.01)
*H04N 5/38* (2006.01)
(Continued)

(52) U.S. Cl.
CPC ......... *H04N 21/43615* (2013.01); *H04N 5/38* (2013.01); *H04N 5/44543* (2013.01); *H04N 5/44582* (2013.01); *H04N 21/4122* (2013.01); *H04N 21/4126* (2013.01); *H04N 21/4307* (2013.01); *H04N 21/4345* (2013.01); *H04N 21/4348* (2013.01); *H04N 21/4385* (2013.01); *H04N 21/43637* (2013.01);
(Continued)

(58) Field of Classification Search
None
See application file for complete search history.

(56) References Cited

U.S. PATENT DOCUMENTS

| 8,978,075 B1 * | 3/2015 | Kaiser | H04N 5/44 725/105 |
| 9,106,975 B1 * | 8/2015 | Gildfind | H04N 21/812 |

(Continued)

FOREIGN PATENT DOCUMENTS

| KR | 10-2005-0003420 | 1/2005 |
| KR | 10-2010-0030048 | 3/2010 |

(Continued)

OTHER PUBLICATIONS

Extended European Search Report mailed May 17, 2016 in counterpart European Patent Application No. 15197065.4.

*Primary Examiner* — Omar S Parra
(74) *Attorney, Agent, or Firm* — Nixon & Vanderhye P.C.

(57) ABSTRACT

A display apparatus and a method of controlling a content output of the display apparatus are disclosed. For example, there are provided a display apparatus and a method of controlling a content output of the display apparatus for separately reproducing received content and an advertisement when content including the advertisement is received. Also, there are provided a display apparatus and a method of controlling a content output of the display apparatus for outputting content on a screen of the display apparatus when content including an advertisement is received and transmitting the advertisement to a portable apparatus connected to the display apparatus to enable the advertisement to be reproduced.

16 Claims, 10 Drawing Sheets

(51) Int. Cl.
    *H04N 5/445*     (2011.01)
    *H04N 21/81*     (2011.01)
    *H04N 21/41*     (2011.01)
    *H04N 21/475*    (2011.01)
    *H04N 21/45*     (2011.01)
    *H04N 21/434*    (2011.01)
    *H04N 21/4363*   (2011.01)
    *H04N 21/43*     (2011.01)
    *H04N 21/4385*   (2011.01)

(52) U.S. Cl.
    CPC ..... *H04N 21/4532* (2013.01); *H04N 21/4755* (2013.01); *H04N 21/812* (2013.01)

(56) References Cited

U.S. PATENT DOCUMENTS

| | | |
|---|---|---|
| 2003/0210888 A1 | 11/2003 | Engle et al. |
| 2010/0061709 A1* | 3/2010 | Agnihotri ............. H04N 5/445 386/241 |
| 2013/0080194 A1 | 3/2013 | Im et al. |
| 2013/0160046 A1 | 6/2013 | Panje et al. |
| 2014/0188983 A1 | 7/2014 | Navok et al. |
| 2014/0359659 A1 | 12/2014 | Tsuchiuchi |
| 2015/0304589 A1* | 10/2015 | Candelore ............. H04W 4/008 348/563 |
| 2015/0317041 A1* | 11/2015 | Lim .................. H04N 21/4312 715/716 |

FOREIGN PATENT DOCUMENTS

| | | |
|---|---|---|
| KR | 10-2014-0086817 | 7/2014 |
| WO | 2012/157791 | 11/2012 |

* cited by examiner

FIG. 2
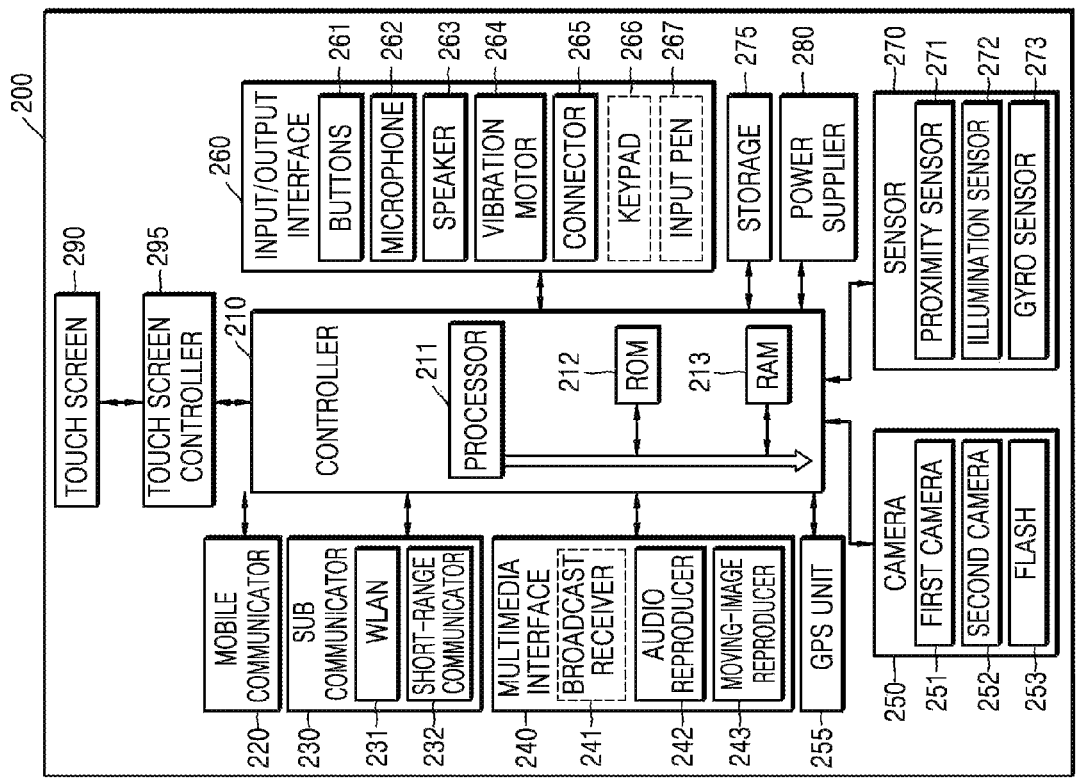
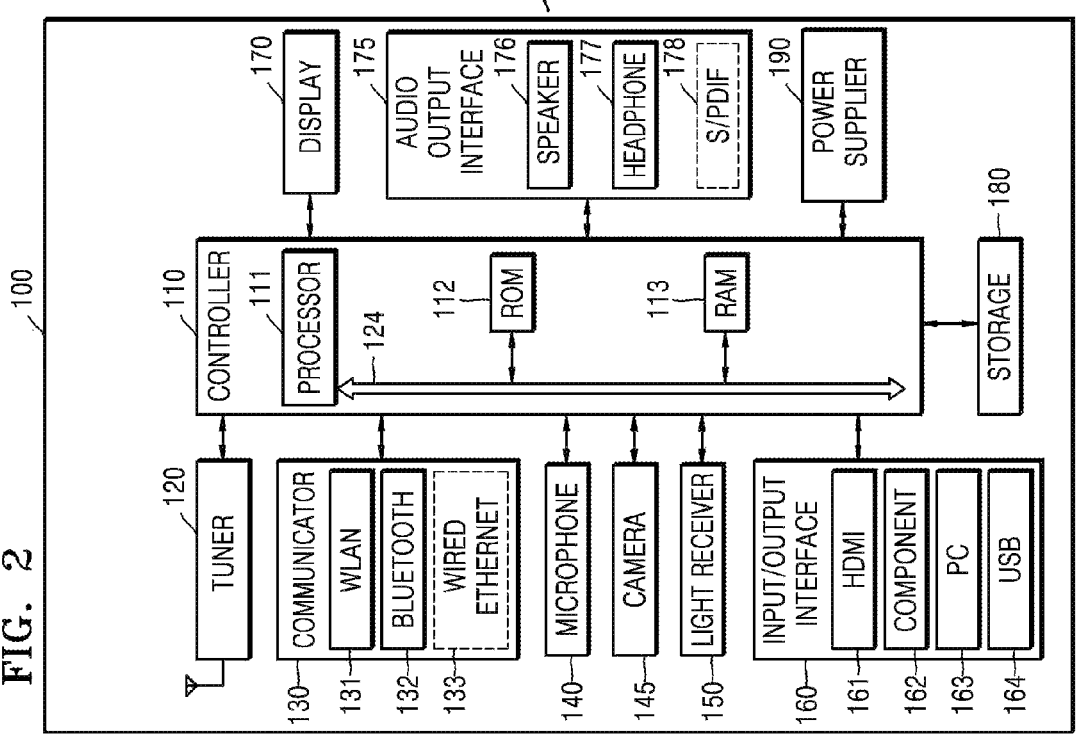

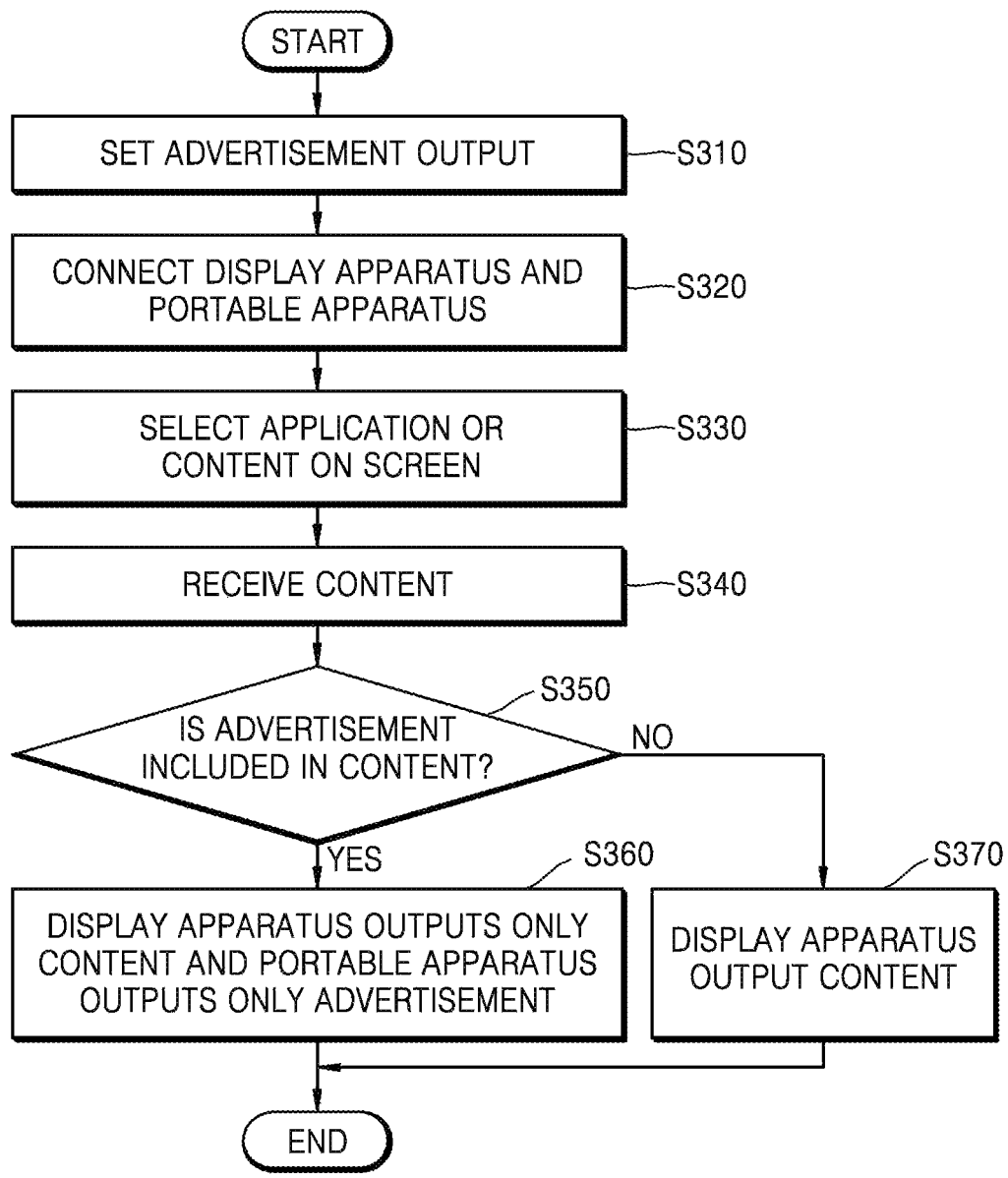

FIG. 4A
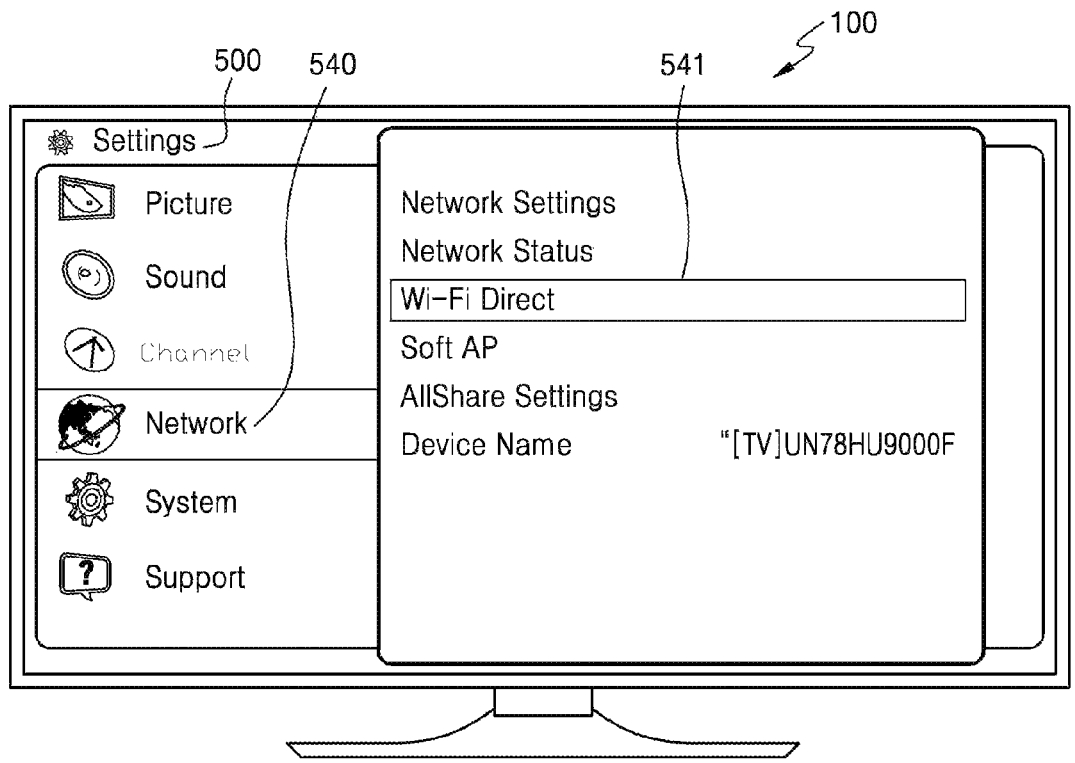
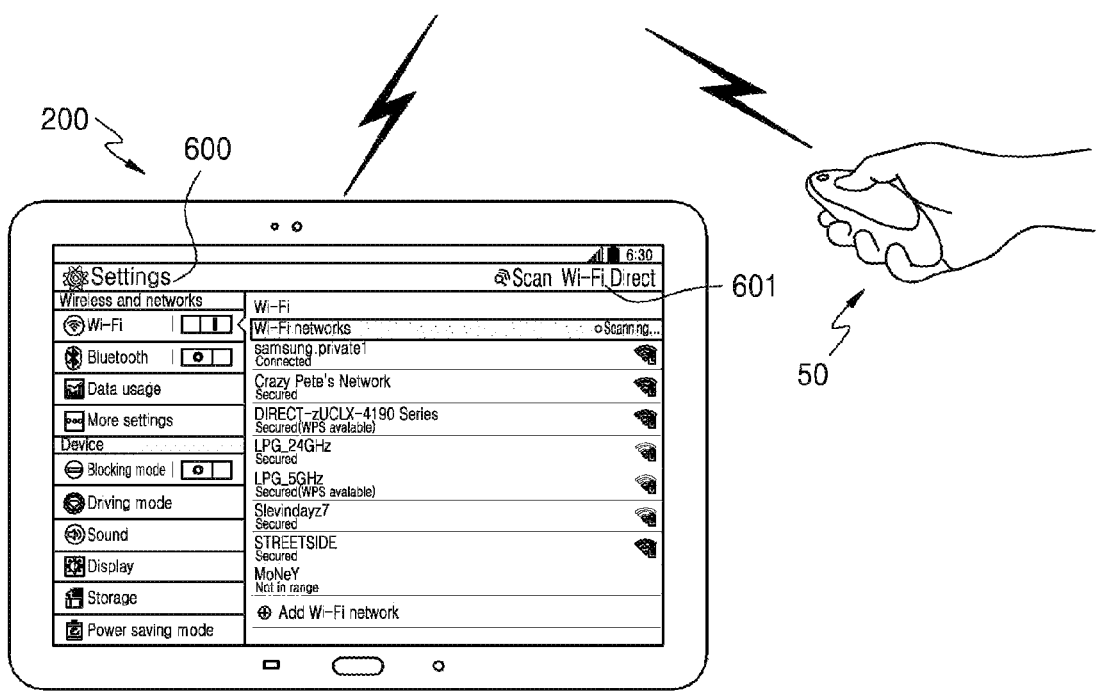

FIG. 4B
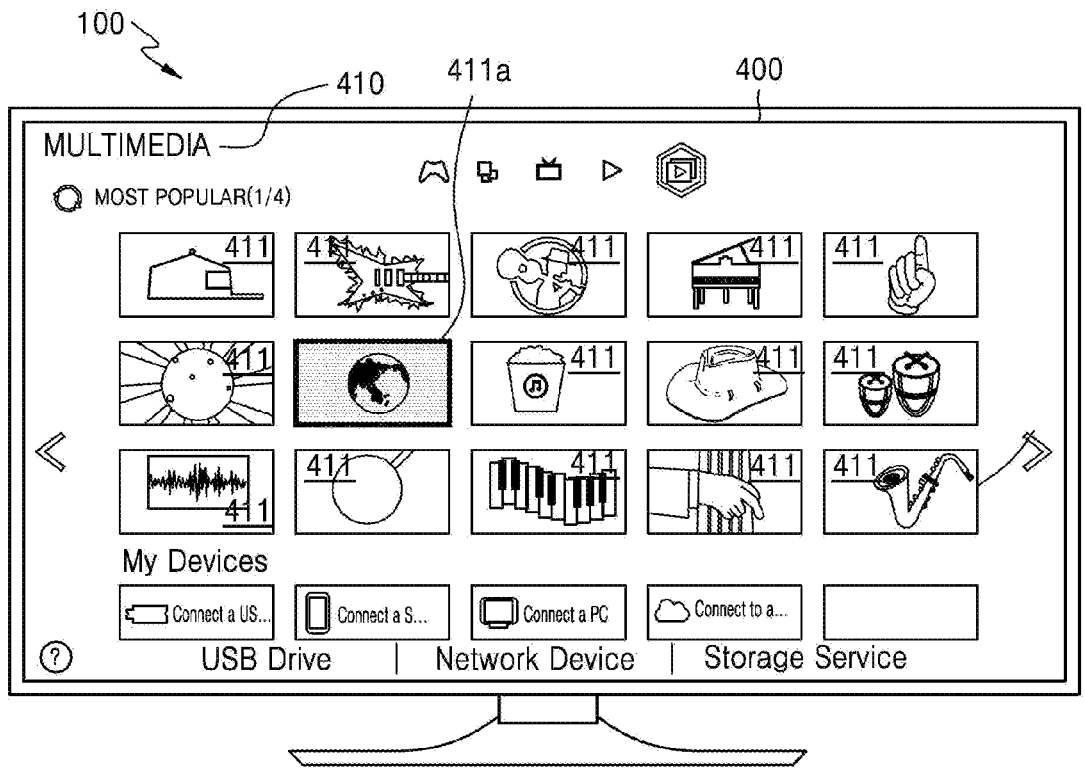
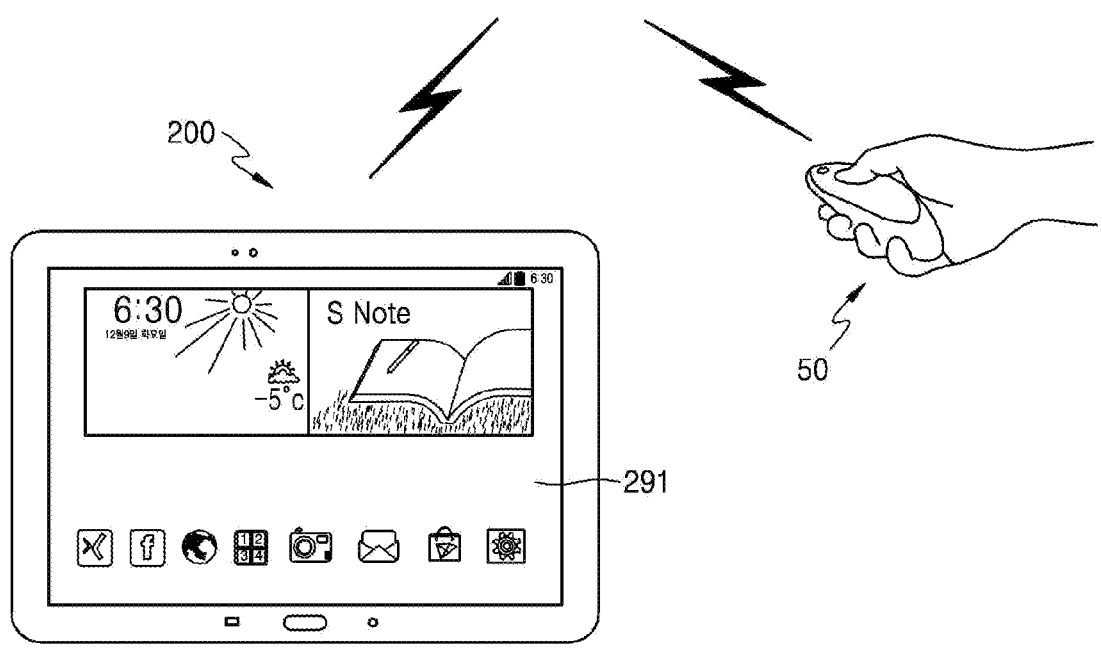

FIG. 4C
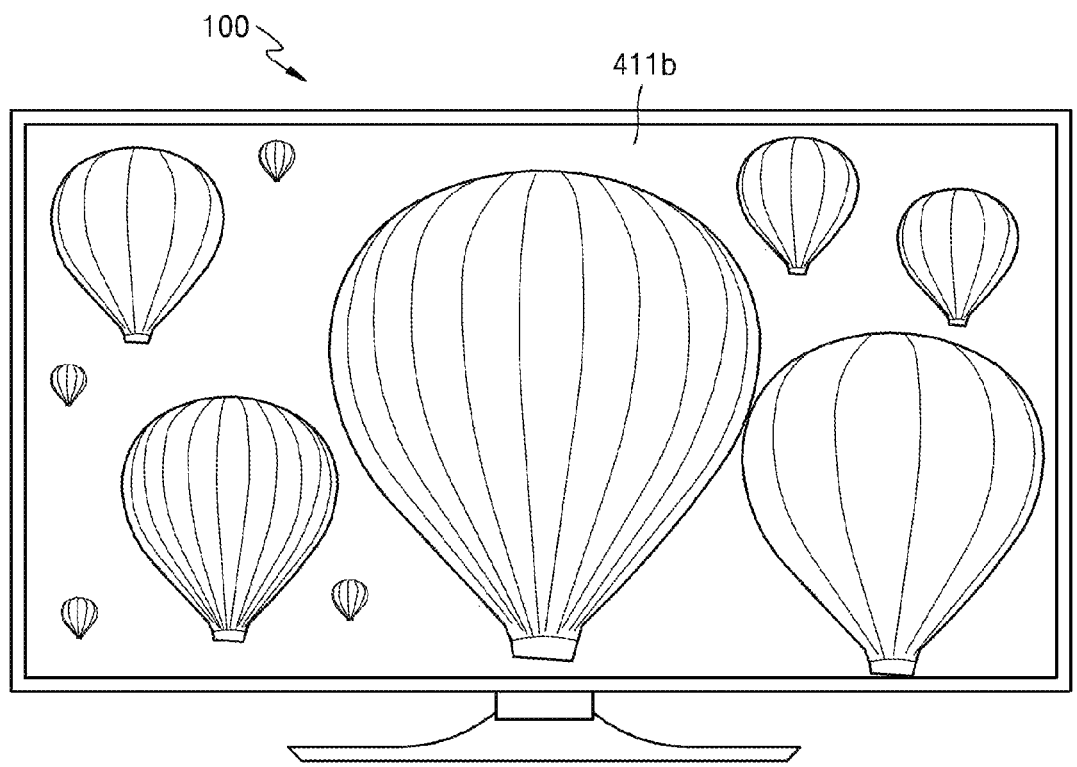
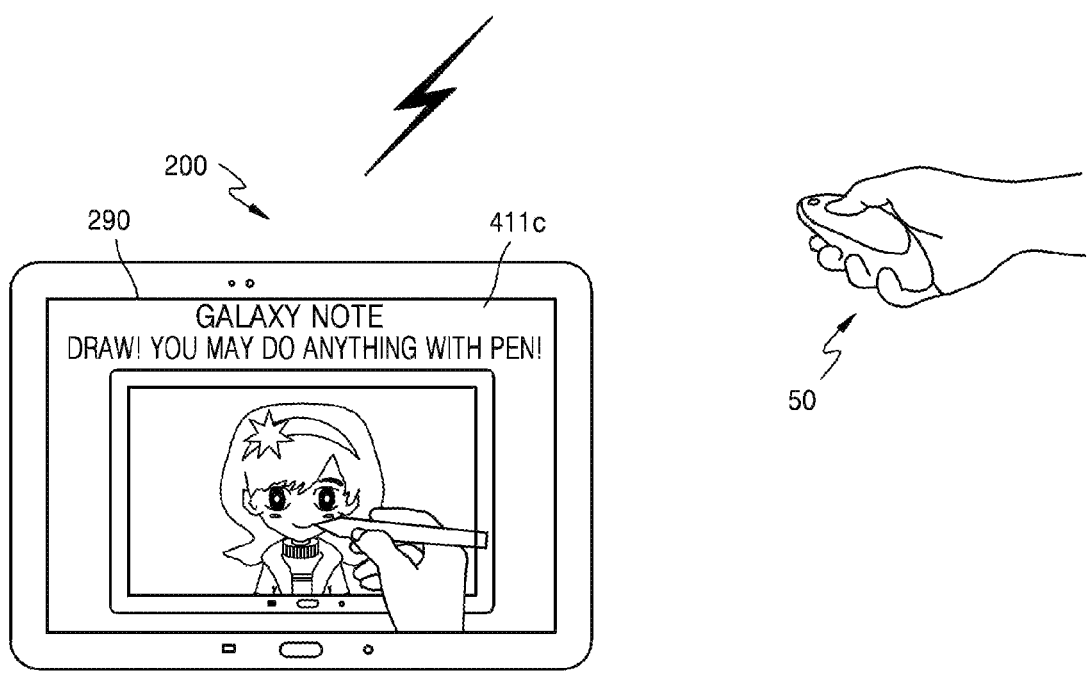

DISPLAY APPARATUS AND METHOD OF CONTROLLING CONTENT OUTPUT OF DISPLAY APPARATUS

CROSS-REFERENCE TO RELATED APPLICATION

This application is based on and claims priority under 35 U.S.C. §119 to Korean Patent Application No. 10-2014-0183302, filed on Dec. 18, 2014, in the Korean Intellectual Property Office, the disclosure of which is incorporated by reference herein in its entirety.

BACKGROUND

1. Field

The disclosure relates to a display apparatus and a method of controlling a content output of the display apparatus, and for example, to a display apparatus and a method of controlling a content output of the display apparatus to separately reproduce a received advertisement and content in the display apparatus and a portable apparatus when the display apparatus connected to the portable apparatus receives content including the advertisement.

2. Description of Related Art

Recently, various services (for example, mobile advertisements, etc.) and functions provided by a TV and/or a mobile phone have been gradually expanding. In addition, the number of opportunities for a TV and/or a mobile phone to be connected to a peripheral electronic apparatus by wire or wirelessly has increased.

When a pre-roll advertisement is included in an application (or content including a video) selected in the TV and/or the mobile phone, a user may first view the pre-roll advertisement on an overall screen. Due to the viewing of the pre-roll advertisement, there is a time delay until the selected application (or content) is executed. The user's immersion in the selected content is impeded due to the time delay and the satisfaction for the application (or content) may be reduced. In addition, while the pre-roll advertisement is executed, an advertising effect may be degraded because there is no method for an advertiser to force the user to be immersed in the advertisement.

SUMMARY

Additional aspects will be set forth in part in the description which follows and, in part, will be apparent from the description.

According to an aspect of an example embodiment, a method of controlling a content output of a display apparatus includes: connecting the display apparatus and a portable apparatus; receiving selection of a symbol on a screen of the display apparatus; receiving external content corresponding to the symbol; and outputting content except an advertisement on the screen of the display apparatus and transmitting the advertisement to the portable apparatus, when the content includes the advertisement.

According to an aspect of another example embodiment, a display apparatus includes: a display; a communicator, e.g., communication circuitry; and a controller configured to control the display and the communication circuitry, wherein the controller is connected to a portable apparatus using the communication circuitry, is configured to receive content including an advertisement corresponding to a symbol selected on the display using the communication circuitry, to transmit the advertisement to the portable apparatus through the communicator, and to cause the display to display content without the advertisement.

According to the aspect of the example embodiment, the method of controlling the content output of the display apparatus may further include setting an advertisement output corresponding to the transmitting of the advertisement from the display apparatus to the portable apparatus.

A display apparatus and a method of controlling a content output of the display apparatus for separately reproducing a received advertisement and content on different screens when the display apparatus receives the content including the advertisement may be provided.

A display apparatus and a method of controlling a content output of the display apparatus for enabling a screen of the display apparatus to output received content and enabling a portable apparatus connected to the display apparatus to reproduce an advertisement by transmitting the advertisement to the portable apparatus when the display apparatus receives content including the advertisement may be provided.

A display apparatus and a method of controlling a content output of the display apparatus for determining whether an advertisement is included by analyzing an adaptation field of a transport stream packet corresponding to content including the advertisement when the display apparatus receives the content including the advertisement may be provided.

A display apparatus and a method of controlling a content output of the display apparatus for determining whether to transmit an advertisement to a portable apparatus using one of pre-stored portable apparatus information and user information when the display apparatus receives content including the advertisement may be provided.

A display apparatus and a method of controlling a content output of the display apparatus for enabling a start time of transmission of an advertisement to a portable apparatus to be controlled based on a content reproduction start time in a screen of the display apparatus and an advertisement reproduction start time in a screen of the portable apparatus when the display apparatus receives content including the advertisement may be provided.

The disclosure is not limited to the above examples. According to various example embodiments, a display apparatus and a method of controlling a content output of the display apparatus for separating content and an advertisement from received content including an advertisement to enable the content and advertisement to be reproduced separately on screens of the display apparatus and another apparatus may be provided.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 2 is a block diagram illustrating an example display apparatus and an example portable apparatus;

FIG. 3 is a flowchart illustrating an example method of controlling a content output of a display apparatus;

FIGS. 4A to 4C are diagrams illustrating an example of a method of controlling a content output of a display apparatus;

DETAILED DESCRIPTION

Figure 1:
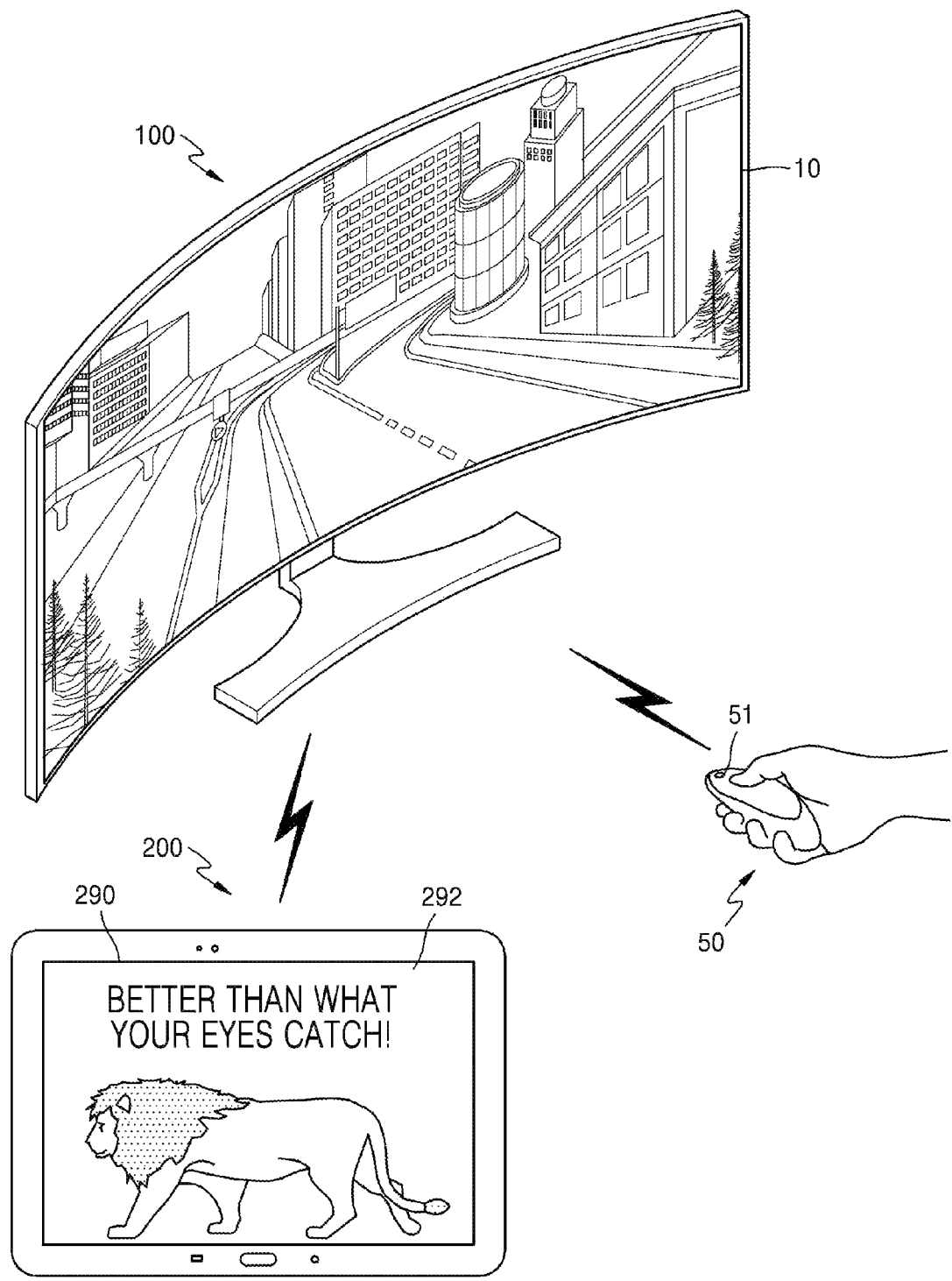
FIG. 1 is a schematic diagram illustrating example operations among a display apparatus, a remote controller, and a portable apparatus.

Reference will now be made in detail to example embodiments, examples of which are illustrated in the accompanying drawings, wherein like reference numerals refer to like elements throughout. In this regard, the examples may have different forms and are not construed as being limited to the descriptions set forth herein. Accordingly, the examples are described below, by referring to the figures, to explain certain aspects. As used herein, the term "and/or" includes any and all combinations of one or more of the associated listed items. Expressions such as "at least one of," when preceding a list of elements, modify the entire list of elements and do not necessarily modify the individual elements of the list.

While such terms as "first," "second," etc., may be used to describe various components, such components are not limited by the above terms. The above terms are used only to distinguish one component from another. For example, a first element could be termed a second element, and a second element could be termed a first element, without departing from the scope of the disclosure.

An application may, for example, include software to be executed in an operating system (OS) for a display apparatus 100, an OS for a computer, an OS for a web, or an OS for a mobile phone and is available to the user. For example, the application may, for example, include a word processor, a spread sheet, an address book application, a calendar application, a memo application, an alarm application, a social networking service (SNS) application, a chatting application, a map application, a music player, or a video player. The application according to the examples may, for example, include software to be executed in a display apparatus or a portable apparatus (for example, a smartphone or the like) connected to the display apparatus wirelessly or by wire. In addition, the application according to the examples may, for example, include software to be executed in the display apparatus in correspondence with a received input.

In the examples, the term "user" may, for example, include a person controlling a function or an operation of the display apparatus 100 using, for example, a remote controller 50, and may, for example, include an operator, a manager, or an installation engineer.

In the examples, an advertisement in an advertisement output may, for example, include a pre-roll advertisement, a mid-roll advertisement, a post-roll advertisement, or an application (app) launch roll advertisement.

A pre-roll advertisement may, for example, be an advertisement (for example, a video file or an image file) to be displayed to the user before selected content (for example, a video file) is reproduced. When the pre-roll advertisement ends, the selected content is reproduced. The pre-roll advertisement, for example, may have various screen sizes such as about 320×480 pixels, 960×640 pixels, 768×1024 pixels, and a pixel size corresponding to a size of a display screen. A file format of the pre-roll advertisement may be any of various file formats such as mp4, jpg, png, and html. A file size of the pre-roll advertisement may be determined based on a reproduction time (for example, about 5 sec, 10 sec, 15 sec, 30 sec, or the like). Those skilled in the art will understand that the screen size, the file format, the file size, and the reproduction time of the pre-roll advertisement may change based on a screen size and function of the display apparatus 100 or the portable apparatus 200.

A mid-roll advertisement may, for example, be an advertisement (for example, a video file or an image file) to be displayed to the user during, such as, for example, in the middle of the reproduced content (for example, a video file). Because a screen size, a file format, a file size, and a reproduction time of the mid-roll advertisement are substantially similar to those of the pre-roll advertisement, redundant description thereof will be omitted.

A post-roll advertisement may, for example, be an advertisement (for example, a video file or an image file) to be displayed to the user after the completion of reproduction of the content (for example, a video file). Because a screen size, a file format, a file size, and a reproduction time of the post-roll advertisement are substantially similar to those of the pre-roll advertisement, redundant description thereof will be omitted.

An app launch roll advertisement application may, for example, be an advertisement (for example, a video file or an image file) to be displayed while an application is being loaded. When the advertisement ends, the application is executed.

"Selecting a key" on the remote controller may, for example, be used to mean that a key is pressed or touched.

The content may be displayed in a reproducible application. For example, the content may include a video file or an audio file to be reproduced by a video player which is one of the applications, a music file to be reproduced by a music player, a photo file to be displayed in a photo gallery, a web page file to be displayed in a web browser, or the like. The content may include a video file, an audio file, a text file, an image file, or a web page to be displayed or executed in the application. In the examples, the term "video" may be used to refer to a moving image. In addition, the content may include a video file, an audio file, a text file, an image file, or a web page to be executed in response to a received user input (for example, a touch or the like).

The content may include a video, an image, text, or a web document. In addition, the content may, for example, include a video including an advertisement, an image including an advertisement, or a web document including an advertisement.

A widget may, for example, include a mini application which is one of graphic user interfaces (GUIs) for more smoothly supporting interaction between the user and the application or OS. For example, widgets include weather widgets, calculator widgets, clock widgets, and the like.

The terms used in the disclosure are merely used to describe examples, and are not intended to limit the examples or the disclosure. An expression used in the singular encompasses the expression of the plural, unless context clearly indicates otherwise. In the disclosure, it is to be understood that terms such as "including," "having," and "comprising" are intended to indicate the presence of features, numbers, steps, actions, components, parts, or combinations thereof disclosed in the disclosure, and are not intended to preclude the possibility that one or more other features, numbers, steps, actions, components, parts, or combinations thereof are present or added. Like reference numerals in the drawings denote like elements which perform substantially the same functions.

FIG. 1 is a schematic diagram illustrating example operations among a display apparatus, a remote controller, and a portable apparatus.

Referring to FIG. 1, a remote controller 50 and a portable apparatus 200 wirelessly connected to the display apparatus 100 are illustrated. The display apparatus 100 may be connected to the portable apparatus 200 by wire.

The remote controller 50 may, for example, control the display apparatus 100 using infrared or short-range communication (for example, Bluetooth). The remote controller 50 may control a state (for example, power ON/OFF) and/or a function of the display apparatus 100 using at least one of the selection of a provided key (including a button) (not illustrated), a touchpad (not illustrated), a microphone (not illustrated) for receiving the user's voice, and a sensor (not illustrated) for recognizing the motion of the remote controller 50. When power is supplied to the display apparatus 100 under control of the remote controller 50, the display apparatus 100 may supply power to an indicator (not illustrated) positioned in a front surface of a bezel 10.

A user may output audio, a video, and/or additional information corresponding to a broadcast channel selected in the display apparatus 100 using the remote controller 50. The user may control an advertisement 292 of content including the advertisement externally received by the display apparatus 100 to be displayed on the portable apparatus 200 using the remote controller 50. The user may control the advertisement 292 of the content including the advertisement received by the display apparatus 100 to be displayed on a touch screen 290 of the portable apparatus 200 through a setting.

FIG. 2 is a block diagram illustrating an example display apparatus and an example portable apparatus.

Referring to FIG. 2, the display apparatus 100 may receive a control signal from the remote controller 50 and may be connected to the portable apparatus 200 by wire or wirelessly using communication circuitry included in a communicator 130. In addition, the display apparatus 100 may be connected to the portable apparatus 200 by wire or wirelessly using an input/output interface 160. The display apparatus 100 may, for example, be referred to as an electronic apparatus or a source apparatus for wirelessly controlling the portable apparatus.

The portable apparatus 200 is an electronic apparatus that is wirelessly connectable to the display apparatus 100 (for example, short-range communication or the like including Bluetooth) or an apparatus connected by wire to the display apparatus 100, and has a speaker. For example, the portable apparatus may include a mobile phone (not illustrated), a smartphone (not illustrated), a desktop personal computer (PC) (not illustrated), a notebook PC (not illustrated), or a tablet PC (not illustrated). The portable apparatus may be referred to as a sink apparatus to be wirelessly controlled by the source apparatus (e.g., the display apparatus 100).

The display apparatus 100 may include a display 170, a tuner 120, communication circuitry referred to as a communicator 130, and an input/output interface 160. In addition, the display apparatus 100 may include a combination of a tuner 120, the communicator 130, and the input/output interface 160 as well as the display 170. In addition, the display apparatus 100 having the display 170 may be electrically connected to a separate external apparatus (for example, a set-top box (not illustrated)) having the tuner.

The display apparatus 100, for example, may be implemented by a digital TV, a three-dimensional (3D) TV, a smart TV, a light-emitting diode (LED) TV, an organic LED (OLED) TV, a plasma TV, a monitor, an analog TV, a curved TV having a screen of fixed curvature, a flexible TV having a screen of fixed curvature, a bent TV having a screen of fixed curvature, and/or a variable curvature TV in which the current screen curvature may be changed, but those skilled in the art will understand that the display apparatus 100 is not limited thereto.

The display apparatus 100 includes the tuner 120, the communicator (e.g., communication circuitry) 130, a microphone 140, a camera 145, a light receiver 150, the input/output interface 160, the display 170, an audio output interface 175, a storage 180, and a power supplier 190. The display apparatus 100 may include a sensor (for example, an illumination sensor, a temperature sensor, or the like) (not illustrated) for detecting an internal or external state of the display apparatus 100.

A controller 110 may include a processor 111, a read only memory (ROM) 112 configured to store a control program for controlling the display apparatus 100, and a random access memory (RAM) 113 configured to store a signal or data input outside the display apparatus 100 or used as a storage region corresponding to various tasks to be performed in the display apparatus 100.

The controller 110 may be configured to control the overall operation of the display apparatus 100 and a signal flow between internal components 120 to 190 of the display apparatus 100 and to perform a function of processing data. The controller 110 may be configured to control power to be supplied from the power supplier 190 to the internal components 120 to 180. In addition, when there is an input of the user or a preset stored condition is satisfied, the controller 110 may be configured to execute the OS and various applications stored in the storage 180.

The processor 111 may, for example, include a graphic processing unit (GPU) (not illustrated) for graphic processing of an image or a video. The processor 111 may be implemented in the form of a system on chip (SoC) including a core (not illustrated) and the GPU (not illustrated). The processor 111 may include a single core, a dual core, a triple core, a quad core, etc.

The processor 111 may include a plurality of processors. For example, the processor 111 may be implemented by a main processor (not illustrated) and a sub processor (not illustrated) operable in a sleep mode. In addition, the processor 111, the ROM 112, and the RAM 113 may be mutually connected through an internal bus.

In the examples, the term "controller of the display apparatus 100" may be considered to include the processor 111, the ROM 112, and the RAM 113.

The controller 110 may be configured to connect the display apparatus 100 and the portable apparatus 200, to externally receive content corresponding to a symbol selected on a screen of the display apparatus 100 through the communicator or communication circuitry 130, and to control the display apparatus 100 so that the content other than an advertisement is output to a screen of the display apparatus 100 and the advertisement is transmitted to the portable apparatus 200 when the content includes the advertisement.

The controller 110 may be configured to allow the user to set an advertisement output corresponding to the transmission of the advertisement from the display apparatus to the portable apparatus.

The controller 110 may be configured to control the advertisement to include at least one of a pre-roll advertisement, a mid-roll advertisement, a post-roll advertisement, and an app launch roll advertisement.

The controller 110 may be configured to control the communication circuitry of the communicator 130 to receive the content in a transport stream packet.

The controller 110 may be configured to control the display apparatus so that it may determine whether an advertisement is included in the content by analyzing an adaptation field of the transport stream packet.

The controller 110 may be configured to determine that a flag corresponding to detection of the pre-roll advertisement and a flag corresponding to detection of the mid-roll advertisement are different from each other in the adaptation field.

The controller 110 may be configured to control the display apparatus to determine whether to transmit the advertisement to the portable apparatus 200 using one of pre-stored portable apparatus information and user information.

The controller 110 may be configured to determine a start time of the transmission of the advertisement to the portable apparatus 200 based on a content reproduction start time in the screen of the display apparatus 100 and an advertisement reproduction start time in a screen of the portable apparatus 200.

The controller 110 may be configured to control the content to be continuously reproduced in the screen of the display apparatus 100 and reproduction of the advertisement is completed in the portable apparatus when a reproduction time of the content is longer than a reproduction time of the advertisement.

The controller 110 may be configured to control at least one of visual feedback and auditory feedback provided in correspondence with the transmission of the advertisement from the display apparatus to the portable apparatus.

Those skilled in the art will understand that a configuration and operation of the controller 110 may be implemented in various ways according to the examples.

The tuner 120 may receive a broadcast signal received wirelessly or by wire including amplification, mixing, resonance, and the like and tune and select a frequency of a channel desired to be received by the display apparatus 100 from among many radio wave components of the broadcast signal. The broadcast signal (for example, a video and/or an audio corresponding to a TV broadcast signal, a radio broadcast signal, or a data broadcast signal) and additional broadcast information (for example, an electronic program guide (EPG)) may be provided.

The tuner 120 may receive a broadcast signal in a frequency band corresponding to a channel number (for example, cable broadcast channel No. 506) based on a user input (for example, a control signal (a channel number input, a channel up-down input, and a channel input in an EPG screen) received from the remote controller 50).

The tuner 120 may receive broadcast signals from various sources such as terrestrial broadcasting, cable broadcasting, satellite broadcasting, and Internet broadcasting. The tuner 120 may also receive a broadcast signal from a source such as digital broadcasting or analog broadcasting. The broadcast signal received through the tuner 120 is subjected to decoding (for example, audio decoding, video decoding, or additional information decoding) and separated into audio, video, and/or additional information. The audio, the video, and/or the additional information after the separation may be stored in the storage 180 under the control of the controller 110.

The number of tuners 120 of the display apparatus 100 may be one or more. The tuner 120 may be implemented in an all-in-one form with the display apparatus 100 or by a separate apparatus having a tuner (not illustrated) electrically connected to the display apparatus 100 (for example, a set-top box (not illustrated) or a tuner (not illustrated) connected to the input/output interface 160).

The communication circuitry of the communicator 130 may connect the display apparatus 100 to the portable apparatus 200 under control of the controller. The controller may be configured to transmit/receive content to/from the portable apparatus 200, download an application, and/or perform web browsing through the communicator 130. The communicator 130 may, for example, include one of a wireless local area network (WLAN) 131, Bluetooth 132, wired Ethernet (133) or a combination of the WLAN 131, the Bluetooth 132 and the Ethernet 133 in correspondence with the performance and structure of the display apparatus 100. In addition, the communicator 130 may receive a remote control signal (including a control signal) of the remote controller 50 under control of the controller 110. The remote control signal may, for example, be implemented in a Bluetooth scheme or a radio frequency (RF) signal scheme.

The communicator 130 may further include short-range communication (for example, Bluetooth low energy, Infra-red Data Association (IrDA), wireless fidelity (Wi-Fi) direct, ultra wideband (UWB), and near field communication (NFC)) other than Bluetooth.

The microphone 140 receives a sound uttered, for example, by the user. The microphone 140 may convert the received utterance into an electrical signal and output the electrical signal to the controller. The user's utterance, for example, may include an utterance corresponding to a menu or function of the display apparatus 100. A recognition range of the microphone 140 is recommended to be, for example, within about 4 m from the microphone 140 to the user's position. The recognition range of the microphone 140 may differ in correspondence with a level of the user's voice and a surrounding environment (for example, a sound from a speaker or ambient noise).

The microphone 140 may be implemented to be integrated with or separate from the display apparatus 100. A separate microphone 140 may be electrically connected to the display apparatus 100 wirelessly through the communicator 130 or through the input/output interface 160.

Those skilled in the art will understand that the microphone 140 may be omitted based on the performance and structure of the display apparatus 100.

The camera 145 receives a video (for examples, a successive frame) corresponding to the user's motion including a gesture in a camera recognition range. For example, a recognition range of the camera 145 located in a front surface (for example, facing the user) or a side surface (for example, in which the camera facing the user has projected from the inside of the bezel 10) of the bezel 10 of the display apparatus 100 may, for example, be a distance within about 0.1 to 5 m from the camera 145 to the user. The user's motion, for example, may include a portion of the user's body or motion of the portion of the user's body such as a face, an expression, a hand, a fist, or a finger of the user. The camera 145 may convert a received video into an electrical signal under control of the controller and output the electrical signal to the controller 110.

The controller may be configured to select a menu displayed on the display apparatus 100 using a received motion recognition result or perform a control action corresponding to the motion recognition result. For example, the control action may include channel adjustment, volume adjustment, and indicator movement.

The camera 145 may be configured with a lens (not illustrated) and an image sensor (not illustrated). The camera 145 may support an optical zoom or a digital zoom using a plurality of lenses and image processing. A recognition range of the camera 145 may be set in various types according to an angle of the camera and an environmental condition. When there are a plurality of cameras 145, it is possible to receive a 3D still image or 3D motion using a second camera (not illustrated) adjacent to a first camera 145 of the bezel 10 (for example, a distance of the second camera 145 from the first camera 145 is greater than about 2 cm or less than about 8 cm).

The camera 145 may be implemented integrally with or separately from the display apparatus 100. A separate apparatus (not illustrated) including the separate camera 145 may be electrically connected to the display apparatus 100 wirelessly through the communicator 130 or through the input/output interface 160.

Those skilled in the art will understand that the camera 145 may be omitted based on the performance and structure of the display apparatus 100.

The light receiver 150 receives a light signal (including a control signal) received from the external remote controller 50 through a light window (not illustrated) located in the bezel 10. The light receiver 150 may receive a light signal corresponding to the user input (for example, a touch through a button, a touch gesture through a touch pad, a voice through a microphone, or motion through a sensor) from the remote controller 50. Under the control of the controller 110, the control signal may be extracted from the received light signal.

The input/output interface 160 receives a video (for example, a moving image or the like), audio (for example, a voice, music, or the like), additional information (for example, an EPG or the like), and the like from the outside of the display apparatus 100 under control of the controller. The input/output interface 160 may include one of a high-definition multimedia interface (HDMI) port 161, a component jack 162, a PC port 163, and a Universal Serial Bus (USB) port 164. The input/output interface 160 may include a combination of the HDMI port 161, the component jack 162, the PC port 163, and the USB port 164.

Those skilled in the art will understand that a configuration and operation of the input/output interface 160 may be implemented in various types according to the examples.

The display 170 displays a video included in a broadcast signal received by the tuner 120 on a screen under control of the controller. The display 170 may display content (for example, a video file or a video/image file corresponding to an advertisement) input through the communication circuitry of the communicator 130 or the input/output interface 160 under control of the controller. The display 170 may output a video stored in the storage 180 under control of the controller. In addition, the display 170 may display a voice user interface (UI) for performing a video recognition task corresponding to voice recognition or a motion UI (for example, including a user motion guide for motion recognition) for performing a motion recognition task corresponding to motion recognition.

The output resolution of the display 170, for example, may include high definition (HD), full HD, ultra HD, or clearer definition than ultra HD.

A diagonal length of the screen of the display apparatus 100, for example, may be about 650 mm or less, 660 mm, 800 mm, 1,010 mm, 1,520 mm, 1,890 mm, or 2,000 mm or more. An aspect ratio of the screen of the display 170, for example, may be about 4:3, 16:9, 16:10, 21:9, or 21:10.

The display 170 according to the examples may output visual feedback corresponding to a separate output of content (for example, a video file or a video/image file corresponding to an advertisement) of the display apparatus 100 under control of the controller.

The audio output interface 175 outputs audio included in a broadcast signal received by the tuner 120 under control of the controller. The audio output interface 175 may output audio (for example, a voice or sound) input through the communicator 130 or the input/output interface 160 under control of the controller. In addition, the audio output interface 175 may output audio stored in the storage 180 under control of the controller. The audio output interface 175 may include at least one of a speaker 176, a headphone output port 177, and a Sony/Philips digital interface format (S/PDIF) output port 178 or a combination of the speaker 176, the headphone output port 177, and the S/PDIF output port 178.

The speaker 176 of the display apparatus 100 may be implemented by 2 channels, 2.1 channels, 4 channels, 4.1 channels, 5.1 channels, 6.1 channels, 7.1 channels, 9.1 channels, or 11.2 channels, but those skilled in the art will understand that the speaker 176 of the display apparatus 100 is not limited thereto.

The audio output interface 175 according to the examples may output auditory feedback corresponding to a separate output of content (for example, a video file or a video/image file corresponding to an advertisement) of the display apparatus 100 under control of the controller.

The storage 180 may store various data, programs, or applications for driving and controlling the display apparatus 100 under control of the controller. The storage 180 may store signals or data to be input/output in correspondence with driving of the tuner 120, the communicator 130, the microphone 140, the camera 145, the light receiver 150, the input/output interface 160, the display 170, the audio output interface 175, and the power supplier 190.

The storage 180 may store control programs for the display apparatus 100 and for control of the controller, an application downloaded initially provided by a manufacturer or externally downloaded, a graphical user interface (GUI) related to the application, an object (for example, an image, text, an icon, a button, or the like) for providing the GUI, user information, documents, databases (DBs), or related data. For example, the user information may include a user identifier (ID), a password, a user name, biological information (for example, a fingerprint, an iris, a heart rate, blood pressure, a body temperature, and the like) of the user, and the like.

Although not illustrated, the storage 180 may include a broadcast receiving module, a channel control module, a volume control module, a communication control module, a voice recognition module, a motion recognition module, a light receiving module, a display control module, an audio control module, an external input control module, a power control module, a power control module of a portable apparatus connected wirelessly (for example, Bluetooth), a voice DB, or a motion DB.

The modules and the DBs (not illustrated) of the storage 180 may be implemented in the form of software for performing a broadcast reception control function, a channel control function, a volume control function, a communication control function, a voice recognition function, a motion recognition function, a light receiving control function, a display control function, an audio control function, an external input control function, a power control function, or a power control function of the portable apparatus connected wirelessly (for example, Bluetooth) in the display apparatus 100. The controller may perform each function using the software stored in the storage unit.

The storage 180 may store display apparatus information of the display apparatus 100.

When the display apparatus 100 is connected to the portable apparatus 200, the storage 180 may store portable apparatus information received from the portable apparatus 200.

The storage 180 may store a storage position of content corresponding to a selected symbol. In addition, the storage 180 may store a transport stream (TS) packet corresponding to content received through the communicator 130.

The storage 180 may store a time at which the display apparatus 100 receives content including an advertisement and a time at which the advertisement starts to be transmitted to the portable apparatus 200.

The storage 180 may store a delay time due to a difference in a time at which the content starts to be displayed on the screen of the display apparatus 100 and/or a time at which the advertisement starts to be transmitted to the portable apparatus 200.

The storage 180 may store a video or image corresponding to visual feedback.

The storage 180 may store a sound corresponding to auditory feedback.

In the examples, the term "storage of the display apparatus 100" includes the storage 180, the ROM 112 or the RAM 113 of the controller, or a memory card (for example, a micro Secure Digital (SD) card or a USB memory (not illustrated)) mounted in the display apparatus 100. In addition, the storage 180 may include a nonvolatile memory, a volatile memory, a hard disk drive (HDD), or a solid state drive (SSD).

The power supplier 190 supplies power input from an external power source to the components 120 to 180 inside the display apparatus 100 under control of the controller. In addition, the power supplier 190 supplies the internal components 120 to 180 with power output from one or more batteries (not illustrated) located inside the display apparatus 100 under control of the controller.

With respect to the components (for example, 120 to 190) of the display apparatus 100 illustrated in FIGS. 1 and 2, at least one component may be added or omitted based on the desired performance of the display apparatus 100. In addition, those skilled in the art will understand that the positions of the components (for example, 120 to 190) may change based on the performance or structure of the display apparatus 100.

Referring to FIG. 2, the portable apparatus 200 is an electronic apparatus having a touch screen 290 and capable of externally transmitting or receiving data (or content) through a communication circuitry included in a communicator 220 or 230. The portable apparatus 200 is an electronic apparatus that may include an input pen and a touch screen and may be capable of externally transmitting or receiving data (or content) through the communicator 220 or 230. The portable apparatus 200 may be an electronic apparatus having the touch screen 290 and a battery (not illustrated). The portable apparatus 200 may be an electronic apparatus having a display (for example, having a display panel without a touch panel, although not illustrated) and capable of externally transmitting or receiving data (or content) through the communicator 220 or 230. In addition, the portable apparatus 200 may include an electronic apparatus capable of transmitting or receiving data (or content) to or from an external apparatus using the interaction (for example, a touch or touch gesture) input to the touch screen 290. The portable apparatus 200 may have one or more touch screens. The portable apparatus 200 may have a plurality of screens into which one touch screen is divided.

The portable apparatus 200 includes a controller 210, a mobile communicator 220, a sub communicator 230, a multimedia interface 240, a camera 250, a Global Positioning System (GPS) unit 255, an input/output interface 260, a sensor unit 270, a storage 275, and a power supplier 280. The portable apparatus 200 includes the touch screen 290 and a touch screen controller 295.

The controller 210 may include a processor 211, a ROM 212 configured to store a control program for controlling the portable apparatus 200, and a RAM 213 configured to store a signal or data input outside the portable apparatus 200 or used as a storage region for various tasks to be performed in the portable apparatus 200.

Because the controller 210 of the portable apparatus 200 is substantially similar to the controller 110 of the display apparatus 100, redundant description thereof will be omitted.

The controller 210 may be configured to control the communication circuitry of the mobile communicator 220 and the sub communicator 230, and may be further configured to control the multimedia interface 240, the camera 250, the GPS unit 255, the input/output interface 260, the sensor unit 270, the storage 275, the power supplier 280, the touch screen 290, and the touch screen controller 295.

When the display apparatus 100 is connected to the portable apparatus 200, the controller 210 may be configured to control received display apparatus information of the display apparatus 100 to be stored.

The controller 210 may be configured to control receiving an advertisement transmitted from the display apparatus 100.

The controller 210 may be configured to control the advertisement received from the display apparatus 100 to be displayed on the screen. In addition, the controller 210 may be configured to control the received advertisement to be displayed on a pop-up play screen having a smaller size than the screen of the portable apparatus 200.

The controller 210 may be configured to control advertisement reproduction information corresponding to advertisement reproduction in the portable apparatus 200 to be transmitted to the display apparatus 100.

The controller 210 may be configured to control at least one of visual, auditory, and tactile feedback to be provided in correspondence with the reception of the advertisement.

In the examples, the term "controller 210 of the portable apparatus 200" may include the processor 211, the ROM 212, and the RAM 213.

The communication circuitry of the mobile communicator 220 may be configured to establish a connection to an external apparatus through a mobile communication network using one or more antennas under control of the controller. The mobile communicator 220 may transmit/receive a radio signal for voice communication, image communication, text message communication (short message service (SMS)), multimedia message communication (multimedia message service (MMS)), and data communication to/from a mobile phone (not illustrated) having a connectable phone number, a smartphone (not illustrated), a tablet PC, a tablet apparatus, or another portable apparatus (not illustrated).

Because the sub communicator 230 is substantially similar to the communicator 130 of the display apparatus 100, redundant description thereof will be omitted.

In the examples, the term "communicator" of the portable apparatus 200 includes the mobile communicator 220 and the sub communicator 230.

The multimedia interface 240 may include a broadcast receiver 241, an audio reproducer 242, or a moving-image reproducer 243. Because the broadcast receiver 241 is substantially similar to the tuner 120 of the display apparatus 100, redundant description thereof will be omitted.

The audio reproducer 242 may reproduce an audio source (for example, an audio file having a file extension of mp3, wma, ogg, or wav) pre-stored in the storage 275 of the portable apparatus 200 or externally received using an audio codec under control of the controller 210.

The moving-image reproducer 243 may reproduce a digital moving-image source (for example, a video file having a file extension of mpeg, mpg, mp4, avi, mov, or mkv) pre-stored in the storage 275 of the portable apparatus 200 or externally received using a video codec under control of the controller 210.

The camera 250 may include at least one of a first camera 251 of a front surface and a second camera 252 of a rear surface for capturing a still image or a video under control of the controller 210. For example, the camera 250 may include one or both of the first camera 251 and the second camera 252.

The first camera 251 and/or the second camera 252 may include an auxiliary light source (for example, a flash 253) for providing an intensity of light necessary for image capturing.

The GPS unit 255 periodically receives signals (for example, orbit information of GPS satellites, time information and a navigation message of the satellites, and the like) from a plurality of GPS satellites (not illustrated) orbiting the Earth. The portable apparatus 200 may determine positions of the plurality of GPS satellites and the portable apparatus 200 using the signals received from the plurality of GPS satellites and determine a distance using a transmission/reception time difference. A position of the portable apparatus 200, a time, or a movement speed of the portable apparatus 200 may be determined through triangulation. An additional GPS satellite may be necessary for orbit correction or time correction.

The input/output interface 260 may include at least one of one or more buttons 261, a microphone 262, a speaker 263, a vibration motor 264, a connector 265, a keypad 266, and an input pen 267.

Referring to FIG. 1, the buttons 261 may include a home button, a menu button, and a return button located in a lower portion of a front surface of the portable apparatus 200. The buttons 261 may include a power/lock button (not illustrated) and at least one volume button (not illustrated) on side surfaces of the portable apparatus 200. In addition, the button 261 of the portable apparatus 200 may be only the home button. The button 261 of the portable apparatus 200 may be implemented as a touch button outside the touch screen 290 as well as a physical button. In addition, the button 261 of the portable apparatus 200 may be displayed in the form of text, an image, or an icon on the touch screen 290.

The microphone 262 receives an external voice or sound to generate an electrical signal under control of the controller. The electrical signal generated from the microphone 262 is converted by an audio codec and the converted signal may be stored in the storage 275 or output through the speaker 263.

The speaker 263 may output sounds corresponding to various signals (for example, a radio signal, a broadcast signal, an audio source, a video file, an image capturing signal, and the like) of the mobile communicator 220, the sub communicator 230, the multimedia interface 240, and the camera 250 outside the portable apparatus 200 using the audio codec under control of the controller.

The speaker 263 may output a sound (for example, a touch operation sound corresponding to a phone number input or an image capturing button operation sound) corresponding to a function to be performed by the portable apparatus 200. One or more speakers 263 may be located in front, side, and rear surfaces of the portable apparatus 200.

The vibration motor 264 may convert an electrical signal into mechanical vibration under control of the controller. The vibration motor 264 may include a linear vibration motor, a bar type vibration motor, a coin type vibration motor, or a piezoelectric vibration motor. One or more vibration motors 264 may be located in the portable apparatus 200.

The connector 265 may be used as an interface for connecting the portable apparatus 200 and an external apparatus (not illustrated) or a power source (not illustrated). Under control of the controller, the portable apparatus 200 may transmit data stored in the storage 275 to the external apparatus (not illustrated) or receive data from the external apparatus (not illustrated) through a wired cable connected to the connector 265.

The keypad 266 may receive a key input from the user for control of the portable apparatus 200. The keypad 266 may include a physical keypad (not illustrated) formed in the front surface of the portable apparatus 200, a virtual keypad (not illustrated) displayed within the touch screen 290, or a physical keypad (not illustrated) connectable wirelessly or by wire.

The input pen 267 may touch or select an object (for example, a menu, text, an image, a video, a graphic, an icon, or a shortcut icon) displayed (configured) on the home screen 291 of the touch screen 290 of the portable apparatus 200 or a screen (for example, a memo screen, a note pad screen, a calendar screen, or the like) displayed by a writing/drawing application.

The input pen 267 may touch a touch screen of a capacitive type, a resistive type, or an electromagnetic resonance (EMR) type or input a character, etc. using the displayed virtual keypad.

The sensor 270 includes at least one sensor for detecting the state of the portable apparatus 200. For example, the sensor 270 may include a proximity sensor 271 for detecting proximity to an electronic apparatus serving as the display apparatus 100 of the user, an illumination sensor 272 for detecting an intensity of light around the electronic apparatus serving as the display apparatus 100, and a gyro sensor 273 for detecting a direction using the rotational inertia of the portable apparatus 200. In addition, the sensor 270 may include an acceleration sensor (not illustrated) for detecting accelerations along three axes (for example, x, y, and z axes) applied to the portable apparatus 200, a gravity sensor for detecting a gravity action direction, or an altimeter for detecting an altitude by measuring an atmospheric pressure.

The sensor 270 may measure motion acceleration and gravity acceleration of the portable apparatus 200. In addition, the sensor 270 may further include a fingerprint sensor (not illustrated) for detecting the user's fingerprint or a heart rate sensor (not illustrated) for detecting the user's heart rate.

The sensor 270 may detect the state of the portable apparatus 200 and generate an electrical signal corresponding to the detected state to transmit the generated electrical signal to the controller.

Under control of the controller, the storage 275 may store signals or data to be input/output in correspondence with operations of the mobile communicator 220, the sub communicator 230, the multimedia interface 240, the camera 250, the GPS unit 255, the input/output interface 260, the sensor 270, and the touch screen 290. The storage 275 may store a GUI related to a control program for the portable apparatus 200 or control of the controller and an application initially provided by a manufacturer or externally downloaded, images for providing the GUI, user information, documents, DBs, or related data.

When the display apparatus 100 is connected to the portable apparatus 200, the storage 275 may store received display apparatus information of the display apparatus 100.

The storage 275 may store an advertisement received from the display apparatus 100.

The power supplier 280 may supply power to the components 220 to 275 inside the portable apparatus 200 under control of the controller. The power supplier 280 may supply the portable apparatus 200 with power input from an external power source (not illustrated) through a wired cable (not illustrated) connected to the connector 265 under control of the controller.

The touch screen 290 includes a touch panel (not illustrated) for receiving a touch input and a display panel (not illustrated) for displaying a screen. The touch screen 290 may provide the user with GUIs corresponding to various services (for example, voice communication, video communication, data transmission, broadcast reception, image capturing, video view, and application execution). The touch screen 290 transmits an analog signal corresponding to a single touch or a multi-touch input through the home screen 291 or the GUI to the touch screen controller 295. The touch screen 290 may receive the input of the single touch or the multi-touch through the user's body (for example, fingers including the thumb) or the input pen 267.

The touch screen 290, for example, may be implemented in a resistive type, a capacitive type, an infrared type, or an acoustic wave type.

The touch screen 290 may include an EMR touch screen. The EMR touch screen further includes a separate EMR touch panel (not illustrated) for receiving an input of an input pen (not illustrated) having a resonance circuit in an EMR type loop coil.

The touch screen controller 295 converts an analog signal corresponding to the single touch or the multi-touch received from the touch screen 290 into a digital signal and transmits the digital signal to the controller. The controller may be configured to determine X and Y coordinates corresponding to a touch position on the touch screen 290 using the digital signal received from the touch screen controller 295. The controller may be configured to control the touch screen 290 using the digital signal received from the touch screen controller 295.

Although the portable apparatus 200 illustrated in FIGS. 1 and 2 has one touch screen, a plurality of touch screens may be provided in the portable apparatus 200. Each touch screen may be located in one housing (not illustrated), separate housings (not illustrated), may be mutually connected through a hinge, or a plurality of touch screens may be located in one flexible housing. Each of the plurality of touch screens may be configured to include a display panel and a touch panel.

Although the display apparatus 100 and the portable apparatus 200 are separated in FIGS. 1 and 2, those skilled in the art will understand that one of two electronic apparatuses (for example, a tablet apparatus and a mobile phone) may be implemented as the display apparatus 100 and the other may be implemented as the portable apparatus 200.

Those skilled in the art will understand that, in terms of the components of the portable apparatus 200 illustrated in FIG. 2, at least one component may be added or omitted in correspondence with performance of the portable apparatus 200.

FIG. 3 is a schematic flowchart illustrating an example method of controlling a content output of a display apparatus.

FIGS. 4A to 4C are diagrams illustrating an example of a method of controlling a content output of a display apparatus.

Figure 5A:
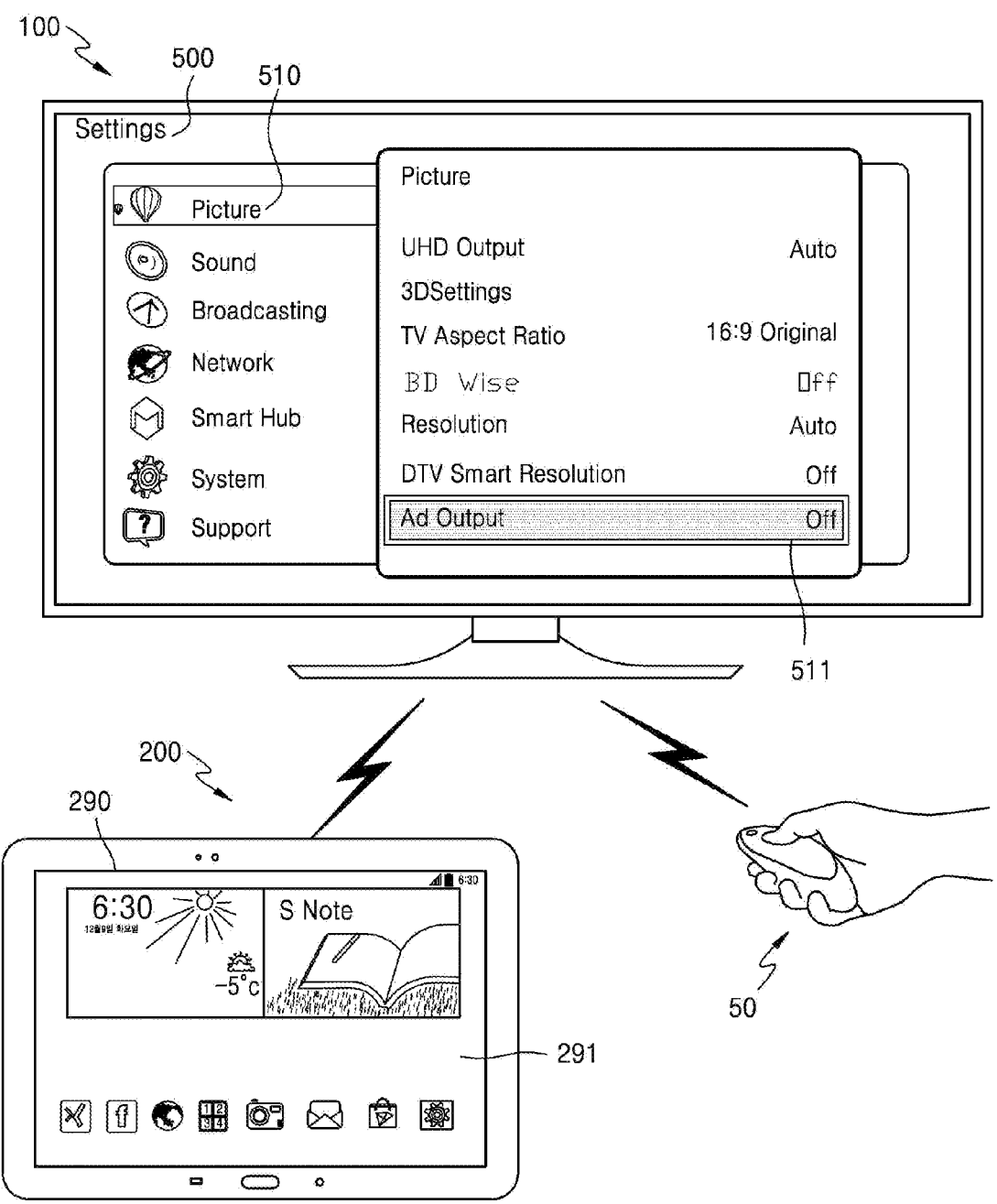
FIGS. 5A and 5B are diagrams illustrating an example of environmental settings of a display apparatus.
Figure 5B:
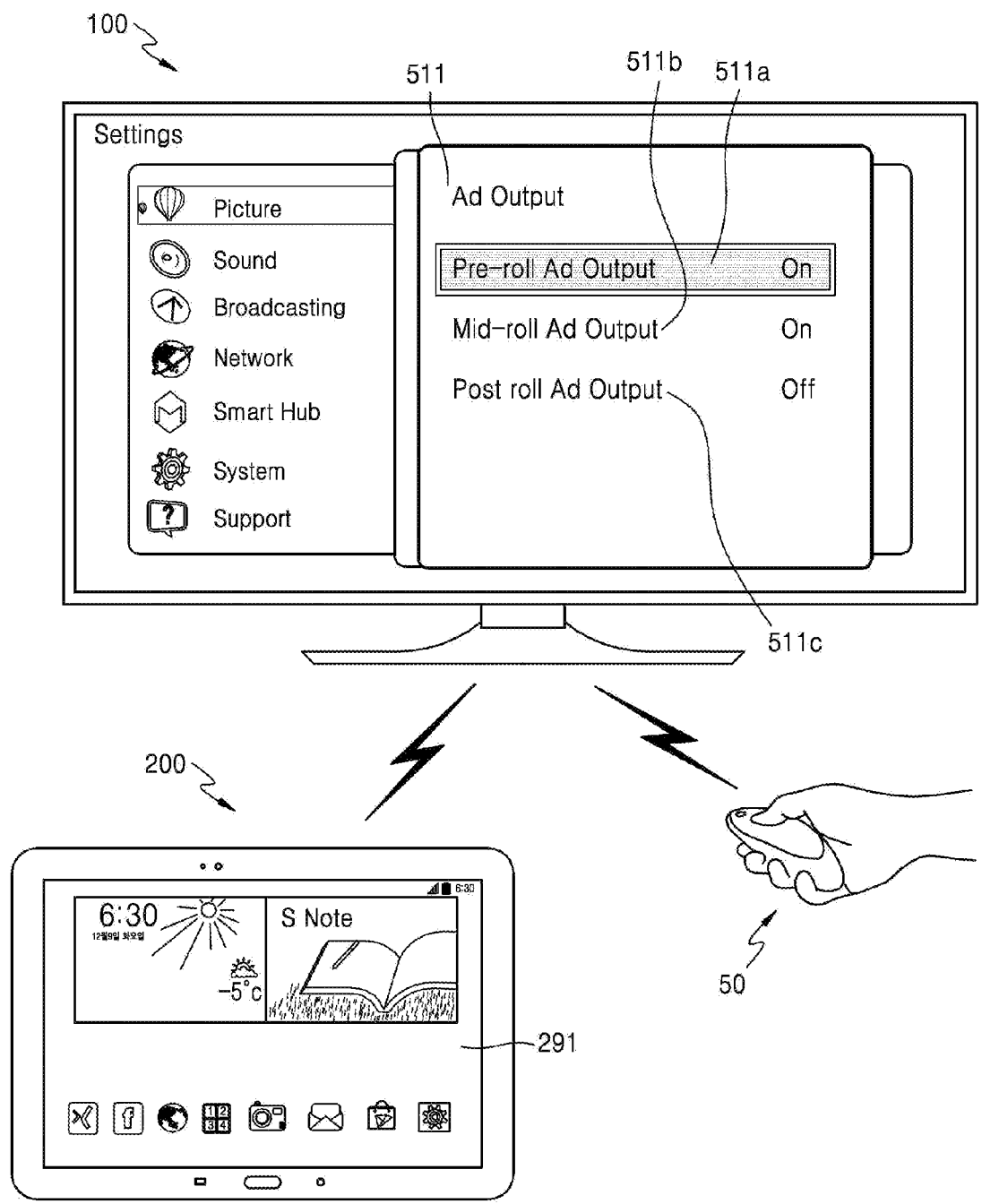

FIGS. 5A and 5B are diagrams illustrating an example of environmental settings of a display apparatus.

In step S310 of FIG. 3, an advertisement output is set.

Referring to FIGS. 5A and 5B, the user may set an advertisement (ad) output among environmental settings 500 of the display apparatus 100. The user may change the environmental settings 500 of the display apparatus 100 using a panel key (not illustrated) located in the rear surface of the remote controller 50 or the display apparatus 100. When the menu key of the remote controller 50 or the display apparatus 100 is selected by the user, the controller of the display apparatus 100 may be configured to display the environmental settings 500 on the screen.

The user may select the ad output 511 in a picture 510 among the environmental settings 500 using the remote controller 50 or the panel key (not illustrated).

When the ad output 511 is selected, the controller of the display apparatus 100 may be configured to display a pop-up window for detailed settings of the ad output 511. In the displayed pop-up window, the ad output 511 may include a pre-roll ad output 511a, a mid-roll ad output 511b, a post-roll ad output 511c, and/or an application (app) launch roll ad output (not illustrated). The controller of the display apparatus 100 may, for example, be configured to receive one of ON/OFF/AUTO selected by the user for the pre-roll ad output 511a.

The controller of the display apparatus 100 may be configured to receive one of ON/OFF/AUTO selected by the user for the mid-roll ad output 511b. In addition, the controller of the display apparatus 100 may be configured to receive one of ON/OFF/AUTO selected by the user for the post-roll ad output 511c. The controller of the display apparatus 100 may be configured to receive one of ON/OFF/AUTO selected by the user for the app launch roll ad output (not illustrated).

When ON of the advertisement output is selected, the controller of the display apparatus 100 may be configured to output content other than the advertisement from content including the advertisement (for example, one of the pre-roll advertisement, the mid-roll advertisement, the post-roll advertisement, and the app launch roll advertisement) on the screen of the display apparatus 100. The controller of the display apparatus 100 may be configured to transmit the advertisement to the portable apparatus 200 through the communicator so that the advertisement is output on the screen of the portable apparatus 200. In addition, when the advertisement is output on the screen of the display apparatus by the controller of the display apparatus 100, the controller of the display apparatus 100 may be configured to transmit the content to the portable apparatus 200 through the communicator so that the content is output on the screen of the portable apparatus 200.

Selection corresponding to a preferential advertisement output (for example, an advertisement output in the display apparatus, an advertisement output in the portable apparatus 200, or the like) in one of the display apparatus 100 and the portable apparatus 200 may be set in an environmental setting (not illustrated) by the user.

When OFF of the advertisement output is selected, the controller of the display apparatus 100 may be configured to output the content including the advertisement (for example, one of the pre-roll advertisement, the mid-roll advertisement, the post-roll advertisement, and the app launch roll advertisement) on only the screen of the display apparatus 100.

When AUTO of the advertisement output is selected, the controller of the display apparatus 100 may be configured to separate the content including the advertisement (for example, one of the pre-roll advertisement, the mid-roll advertisement, the post-roll advertisement, and the app launch roll advertisement) into the advertisement and content, and ask the user whether to output the advertisement using a separate pop-up window (not illustrated) displayed on the screen of the display apparatus 100. In addition, when AUTO of the advertisement output is selected, the controller of the display apparatus 100 may be configured to determine whether to separately output the content including the advertisement (for example, one of the pre-roll advertisement, the mid-roll advertisement, the post-roll advertisement, and the app launch roll advertisement) based on the user information (for example, a favorite advertisement, an advertisement having priority, or the like) stored in the storage.

When the user selects a return/exit button in the remote controller 50 or the panel key (not illustrated), the controller of the display apparatus 100 may be configured to end the setting for the ad output 511 in the environmental setting of the picture 510.

Those skilled in the art will understand that the controller of the display apparatus 100 may also be configured to perform the setting by the user for the ad output 511 in the environmental setting of the picture 510 in a state in which the display apparatus 100 is connected to the portable apparatus 200.

The home screen 291 including a shortcut icon and/or widget corresponding to the application may be displayed on the screen of the portable apparatus 200.

In step S320 of FIG. 3, the display apparatus is connected to the portable apparatus.

Referring to FIG. 4A, the display apparatus 100 and the portable apparatus 200 may be connected by the user. The user may search for the portable apparatus 200 through the environmental settings 500 of the display apparatus 100. In addition, the user may search for the display apparatus 100 through selection of Wi-Fi direct 601 of environmental settings 600 of the portable apparatus 200.

The user may select a network 540 from among the environmental settings 500 of the display apparatus 100 using the remote controller 50 or the panel key (not illustrated). In addition, the user may select Wi-Fi direct 541 in the network 540 among the environmental settings 500 of the display apparatus 100 using the remote controller 50 or the panel key (not illustrated). When the Wi-Fi direct 541 is selected by the user, the controller of the display apparatus 100 may be configured to search for an electronic apparatus in range for supporting a Wi-Fi direct communication scheme.

The user may select the portable apparatus 200 which is a connection target from a search list (not illustrated) corresponding to a search result displayed on the screen of the display apparatus 100. When the user accepts a connection request of the display apparatus 100 displayed through the screen of the portable apparatus 200, the controller of the display apparatus 100 may be configured to establish a connection to the communicator of the portable apparatus 200 through wireless communication using the communicator based on the selection of the user.

The controller of the display apparatus 100 may be configured to be mutually connected to the portable apparatus 200 in the Wi-Fi direct communication scheme. The controller of the display apparatus 100 may be configured to transmit the content to the portable apparatus 200 in the Wi-Fi direct communication scheme.

The Wi-Fi direct communication scheme is only an example and the disclosure is not limited thereto. Those skilled in the art will understand that the display apparatus 100 may be connected to the portable apparatus 200 in a communication scheme in which content (for example, a video file or a video/image file corresponding to the advertisement) may be transmitted.

When the display apparatus 100 is mutually connected to the portable apparatus 200, the controller of the display apparatus 100 may be configured to store portable apparatus information received from the portable apparatus 200 in the storage. The stored portable apparatus information may include wireless communication information (for example, including a wireless communication scheme, a service set identifier (SSID), an Internet protocol (IP) address, a medium access control (MAC) address, a channel number, a security key, or the like), a product name of the portable apparatus 200, an ID of the portable apparatus 200, a type of portable apparatus 200, a profile supported by the portable apparatus 200, an extension of a video capable of being reproduced by the portable apparatus 200, video codec information, a display size of the portable apparatus 200, display resolution of the portable apparatus 200, connection information (for example, connection or disconnection) between the display apparatus 100 and the portable apparatus 200, a wireless communication scheme supported by the portable apparatus 200, or the like. In addition, the controller of the display apparatus 100 may be configured to store user information received from the portable apparatus 200 in the storage. For example, the user information may include a user ID, a password, a user name, biological information (for example, a fingerprint, an iris, a heart rate, blood pressure, a body temperature, and the like) of the user, and the like.

In addition, when the display apparatus 100 and the portable apparatus 200 are mutually connected, the controller 210 of the portable apparatus 200 may be configured to store display apparatus information received from the display apparatus 100 in the storage 275. The stored display apparatus information may include wireless communication information (for example, including a wireless communication scheme, an SSID, an IP address, a MAC address, a channel number, a security key, or the like), a product name of the display apparatus 100, an ID of the display apparatus 100, a type of the display apparatus 100, a profile supported by the display apparatus 100, a display size, display resolution, connection information (for example, connection or disconnection) between the display apparatus 100 and the portable apparatus 200, a wireless communication scheme supported by the display apparatus 100, or the like.

In step S330 of FIG. 3, an application or content is selected on the screen.

Referring to FIG. 4B, a multimedia panel 410 serving as one of various panels included in a smart hub 400 may be displayed on the screen of the display apparatus 100 by the user's selection. In addition, the multimedia panel 410 may be displayed on the screen of the display apparatus 100 by the user's selection. The controller of the display apparatus 100 may display the multimedia panel 410 in correspondence with selection of the remote controller 50 or the panel key (not illustrated).

The multimedia panel 410 may display a list 411 of content capable of being reproduced in the display apparatus 100. The multimedia panel 410 may display the list 411 of content (for example, a video, a photo, a music file, and the like) stored in the storage unit, the connected USB storage apparatus (not illustrated), the connected camera (not illustrated) or the storage (not illustrated) of the server. The multimedia panel 410 may be a separate screen for displaying the list 411 of content capable of being reproduced.

The display apparatus 100 may provide the user with services such as game download/execution, Internet search, application download/execution, communication through an SNS, movie viewing, and execution of multimedia content (for example, a video, a photo, a music file, and the like).

The display apparatus 100 may display a game panel (not illustrated) corresponding to a list of games capable of being executed or downloaded, an app panel (not illustrated) corresponding to a list of applications capable of being executed or downloaded, a TV panel (not illustrated) corresponding to a list of TV programs currently being broadcast or scheduled to be broadcast, a movie panel (not illustrated) corresponding to a list of movies capable of being executed or downloaded, or the multimedia panel 410 corresponding to the multimedia content list 411 serving as a set of multimedia content capable of being reproduced.

The user selects a symbol 411*a* (for example, an icon, a thumbnail image, or text) corresponding to content serving as a reproduction target on the multimedia panel 410 using the remote controller 50 or the panel key (not illustrated). Based on the selection of the symbol 411*a* by the remote controller 50 or the panel key (not illustrated), the controller of the display apparatus 100 may be configured to be connected to a server (not illustrated) and/or an advertisement server (not illustrated) corresponding to the symbol 411*a* using the communication unit.

The user selects a shortcut icon (not illustrated) corresponding to an executable application (not illustrated) on the app panel (not illustrated) using the remote controller 50 or the panel key (not illustrated). In correspondence with the selection of the shortcut icon by the remote controller 50 or the panel key (not illustrated), the controller of the display apparatus 100 may execute an application (not illustrated). The user may select content (for example, a video file (not illustrated)) from the executed application (not illustrated). In correspondence with the selection of the content (not illustrated) by the remote controller 50 or the panel key (not illustrated), a connection to a server (not illustrated) corresponding to content (not illustrated) may be established using the communication circuitry of the communicator.

The controller of the display apparatus 100 may be configured to request the server (not illustrated) to perform content download (for example, including streaming) using an address (uniform resource locator (URL)) of the server (not illustrated) storing content corresponding to the symbol 411*a*. The controller of the display apparatus 100 may be configured to request the advertisement server (not illustrated) to perform advertisement download (for example, including streaming) using a URL of the advertisement server (not illustrated) storing the advertisement corresponding to the symbol 411*a*.

Because a content download request corresponding to content selected through an application (not illustrated) in the app panel (not illustrated) is substantially similar to a content download request corresponding to the symbol 411*a* in the multimedia panel 410, redundant description thereof will be omitted.

In addition, the controller of the display apparatus 100 may be configured to transmit user information to the server (not illustrated) using the communicator. The controller of the display apparatus 100 may be configured to transmit portable apparatus information of the portable apparatus 200 capable of outputting the advertisement to the server (not illustrated) using the communicator. When the display apparatus 100 is mutually connected to the portable apparatus 200, the controller of the display apparatus 100 may be configured to transmit user information and/or portable apparatus information to the server (not illustrated) using the communicator. When the display apparatus 100 is not mutually connected to the portable apparatus 200, the controller of the display apparatus 100 may be configured to not transmit user information and/or portable apparatus information (for example, including connection information corresponding to the connection between the display apparatus 100 and the portable apparatus 200) to the server (not illustrated) using the communicator. In addition, the controller of the display apparatus 100 may be configured to transmit display apparatus information to the server (not illustrated) using the communicator.

The server (not illustrated) may receive a download request of content transmitted from the display apparatus 100. In response to the received content download request, the controller (not illustrated) of the server (not illustrated) may be configured to perform transmission (for example, including streaming) of content (for example, a video file including the advertisement (for example, a video file or an image file)) corresponding to the symbol 411*a* stored in the storage (not illustrated) to the display apparatus 100. In response to the received content download request, the controller (not illustrated) of the server (not illustrated) may be configured to multiplex content and an advertisement (for example, a video file or an image file) corresponding to the symbol 411*a* stored in the storage (not illustrated) to perform the transmission (for example, including streaming) of the multiplexed content and advertisement to the display apparatus 100. In addition, in response to the received content download request, the controller (not illustrated) of the server (not illustrated) may be configured to multiplex content (for example, a video file) stored in the storage (not illustrated) and an externally received advertisement (for example, a video file or an image file) to perform the transmission (for example, including streaming) of the multiplexed content and advertisement to the display apparatus 100.

In addition, the server (not illustrated) may receive user information and/or portable apparatus information transmitted from the display apparatus 100. The controller (not illustrated) of the server (not illustrated) may be configured to determine whether to download content using at least one of the received user information and portable apparatus information (for example, the user information, the portable apparatus information, or both the user information and the portable apparatus information). In addition, the controller (not illustrated) of the server (not illustrated) may be configured to determine whether to download the content using connection information of the display apparatus 100 and the portable apparatus 200 included in one of the received portable apparatus information and display apparatus information.

When the content download is determined by the controller (not illustrated) of the server (not illustrated), the controller (not illustrated) of the server (not illustrated) may be configured to perform transmission (for example, including streaming) of content (for example, a video file including an advertisement (for example, a video file or an image file)) to the display apparatus 100. In addition, when the content download is determined by the controller (not illustrated) of the server (not illustrated), the controller (not illustrated) of the server (not illustrated) may be configured to multiplex the content and the advertisement (for example, the video file or the image file) or multiplex the content (for example, the video file) and the externally received advertisement (for example, the video file or the image file) to perform transmission (for example, including streaming) of the multiplexed content and advertisement to the display apparatus 100.

The controller (not illustrated) of the server (not illustrated) may be configured to store the received content download request in a storage (not illustrated).

In step S340 of FIG. 3, content corresponding to the selected symbol is received.

The controller of the display apparatus 100 may be configured to receive content (for example, a video file and a video/image file corresponding to an advertisement) corresponding to the user's selection from the server (not illustrated). The received content may be mixed content including the advertisement (for example, one of a pre-roll advertisement, a mid-roll advertisement, a post-roll advertisement, and an app launch roll advertisement). The mixed content may be received as a Moving Picture Experts Group (MPEG) packet.

The controller of the display apparatus 100 may be configured to receive the content corresponding to the user's selection from the server (not illustrated) and receive the advertisement from the advertisement server (not illustrated). The content and the advertisement may be received in an MPEG packet. The controller of the display apparatus 100 may be configured to receive the content corresponding to the user's selection through Ethernet or a WLAN.

The controller of the display apparatus 100 may be configured to store the received content in the storage.

Figure 6:
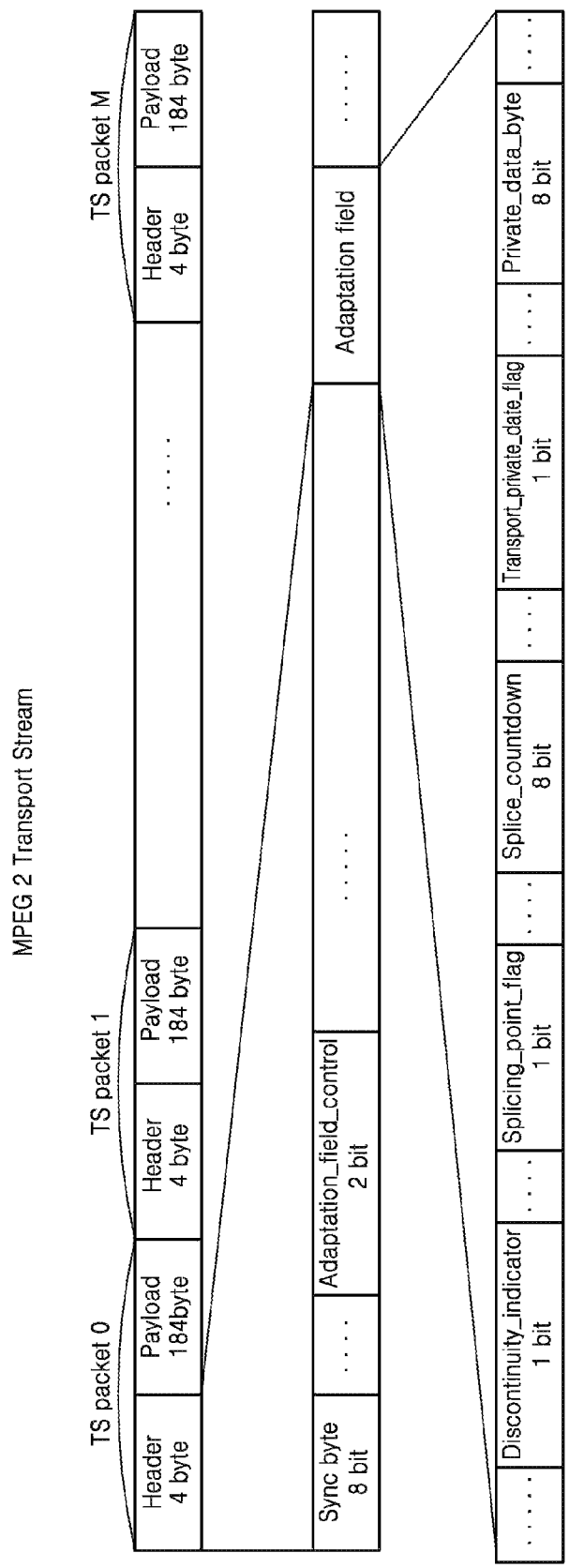
FIG. 6 is a diagram illustrating an example format of a data packet.

FIG. 6 is a diagram illustrating an example format of a data packet.

In step S350 of FIG. 3, it is determined whether to include an advertisement in content.

The controller of the display apparatus 100 may be configured to determine whether to include the advertisement in the content by analyzing the received MPEG packet (or data packet). Although description is given based on the MPEG packet (for example, MPEG-transport stream (TS) packet) in the example, those skilled in the art will understand that the disclosure is not limited thereto.

The controller of the display apparatus 100 may be configured to determine whether to include the advertisement in the content after the content is stored in the storage or while the content is stored.

Referring to FIG. 6, the data packet corresponding to the received mixed content (or content) includes a plurality of TS packets. Each TS packet includes a header field and a payload field. The TS packet may include an adaptation field after the header field.

The header field of the TS packet is a field in which a bit value assigned to the payload field is defined. In addition, the payload field is a field to which bit values of content (for example, a video file) corresponding to the symbol 411*a* and an advertisement (for example, a video file and/or an image file corresponding to one of a pre-roll advertisement, a mid-roll advertisement, a post-roll advertisement, and an app launch roll advertisement) corresponding to the symbol 411*a* are allocated.

The header field may include a sync bit field having a fixed value of '0x47,' a packet ID field indicating a data type of the payload field, and an adaptation field control field (adaptation_field_control). An adaptation field (adaptation_field) may be included in correspondence with the adaptation field control field.

A 2-bit adaptation field control field (adaptation_field_control) is a field indicating whether there is an adaptation field (adaptation_field) after a header field. When a value of adaptation field control is "00," the adaptation field indicates a reserved state. When a value of adaptation field control is "01," this indicates a state in which there is only a payload field without an adaptation field. When the value of adaptation field control is "10," this indicates a state in which there is only an adaptation field. When the value of adaptation field control is "11," this indicates a state in which there are both an adaptation field and a payload field. When the value of adaptation field control is "10" or "11," the adaptation field is added to the header field.

In the example, the controller of the display apparatus 100 may be configured to determine whether an advertisement (for example, a pre-roll advertisement or a post-roll advertisement) of the TS packet is included by analyzing the adaptation field.

For example, when a value of a transport private data flag field (transport_private_data_flag) is "1" in the adaptation field, an 8-bit private data byte field (transport_data_byte) is allocated to the adaptation field. Also, the transport private data length field (transport_private_data_length) may indicate a byte length of the private data byte field. When the value of the private data byte field is "11," this may indicate that the next continuous TS packet (for example, corresponding to the pre-roll advertisement) is different from a previously received TS packet. For example, when the value of the transport private data flag field is "1" and the value of the private data byte field is "11," this may indicate that the pre-roll advertisement is received.

In this example, the controller of the display apparatus 100 may be configured to determine the detection of the pre-roll advertisement through the analysis of the TS packet. In addition, the controller of the display apparatus 100 may be configured to determine a reception time of the pre-roll advertisement using the value of the private data byte field.

Because the detection of an advertisement (for example, the post-roll advertisement) in a TS packet in another example is substantially similar to the detection of the advertisement (for example, the pre-roll advertisement) of the TS packet in this exemplary embodiment, redundant description thereof will be omitted.

In another example, the adaptation field may indicate the discontinuity of the TS packet and a program clock reference (PCR). The discontinuity of the TS packet may indicate the discontinuity of the PCR which causes a change in the PCR value in a continuous TS packet. In addition, the discontinuity of the TS packet may indicate that continuity_counter corresponding to a serial number of the continuous TS packet does not continuously increase.

When a value of a splicing_point_flag field is "1" in the adaptation field, this indicates that a field corresponding to a splicing point flag is allocated to the adaptation field. A value of a splice_countdown field may indicate that the next continuous TS packet is different from the previously received TS packet. For example, when the splice countdown occurs while a TS packet corresponding to content (for example, a video file) having a determined time length is received, this may indicate that the advertisement (for example, the mid-roll advertisement) has been inserted. A value of the 8-bit splice countdown field gradually decreases in number through 256 packets (for example, 255, 254, . . . , 0). When the value of the splice countdown field is 0, the advertisement (for example, the mid-roll advertisement) may be reproduced. When the reproduction of the advertisement ends, the value of the splice countdown field decreases from 255 to 0. When the value of the splice countdown field is 0, the controller of the display apparatus 100 may be configured to continuously receive the content.

In another example, the controller of the display apparatus 100 may be configured to determine whether there is discontinuity of the TS packet based on the detection of the mid-roll advertisement through the analysis of the TS packet. When the discontinuity occurs in the TS packet, the server sets the discontinuity_indicator value and the splicing point flag value to "1" in the adaptation field of the TS packet and transmits a setting result. The controller of the display apparatus 100 may be configured to determine the discontinuity of content (for example, a video file) using the discontinuity_indicator value and the splicing point flag value. In addition, the controller of the display apparatus 100 may be configured to determine a discontinuity time of content (for example, a video file) using the splice countdown value.

When content includes the advertisement in step S350 of FIG. 3, the process proceeds to step S360 of FIG. 3.

In step S360 of FIG. 3, the display apparatus outputs the content and the portable apparatus outputs the advertisement.

Referring to FIG. 4C, the controller of the display apparatus 100 may be configured to perform the output (for example, including streaming) of content (for example, a video file) in the received content including the advertisement (for example, before content reception completion) to the screen of the display apparatus 100. The controller of the display apparatus 100 may be configured to perform the transmission (for example, including streaming) of the advertisement (for example, one of the pre-roll advertisement, the mid-roll advertisement, the post-roll advertisement, and the app launch roll advertisement) in the received content including the advertisement to the connected portable apparatus 200 using the communicator.

The controller of the display apparatus 100 may be configured to transmit the advertisement in the received content including the advertisement (for example, one of the pre-roll advertisement, the mid-roll advertisement, the post-roll advertisement, and the app launch roll advertisement) to the portable apparatus 200 through the Wi-Fi direct communication scheme. In addition, the controller of the display apparatus 100 may be configured to set a communication scheme of receiving the content including the advertisement from the server (not illustrated) and a communication scheme of transmitting the advertisement (for example, one of the pre-roll advertisement, the mid-roll advertisement, the post-roll advertisement, and the app launch roll advertisement) included in the content from the display apparatus 100 to the portable apparatus 200 differently. For example, the controller of the display apparatus 100 may be configured to use Ethernet or the WLAN in reception of content including the advertisement from the server (not illustrated). The controller of the display apparatus 100 may be configured to use the Wi-Fi direct scheme or the short-range communication in the transmission of the received advertisement from the display apparatus 100 to the portable apparatus 200.

In addition, the controller of the display apparatus 100 may be configured to set a communication scheme of receiving the content including the advertisement from the server (not illustrated) and a communication scheme of transmitting the advertisement included in the content from the display apparatus 100 to the portable apparatus 200 equally. For example, the controller of the display apparatus 100 may be configured to use the WLAN (for example, using a first band in the WLAN for supporting a dual band) in the reception of the content including the advertisement from the server (not illustrated). The controller of the display apparatus 100 may also be configured to use the WLAN (for example, using a second band in the WLAN for supporting the dual band) in the transmission of the received advertisement from the display apparatus 100 to the portable apparatus 200.

When the reception of the content is completed, the controller of the display apparatus 100 may be configured to output the received content to the screen of the display apparatus 100. When the reception of the content is completed, the controller of the display apparatus 100 may be configured to perform the transmission (for example, including streaming) of the received advertisement (for example, one of the pre-roll advertisement, the mid-roll advertisement, the post-roll advertisement, and the app launch roll advertisement) to the portable apparatus 200 using the communicator.

When the connection between the display apparatus 100 and the portable apparatus 200 ends, the controller of the display apparatus 100 may be configured to establish a reconnection to the portable apparatus 200 using portable apparatus information stored in correspondence with the advertisement detection. When the display apparatus 100 and the portable apparatus are reconnected, the controller of the display apparatus 100 may be configured to transmit the received advertisement to the portable apparatus 200.

Before the advertisement (for example, streaming or a video file and/or an image file) in the content including the advertisement to be received (or which has been received) is transmitted to the portable apparatus 200, the controller of the display apparatus 100 may be configured to determine whether to transmit the advertisement to the portable apparatus 200 using stored portable apparatus information. The controller of the display apparatus 100 may be configured to determine whether the portable apparatus 200 may reproduce a video file or an image file corresponding to the advertisement using portable apparatus information. For example, the resolution of the video file and/or the image file, the supported codec, or the file format corresponding to the advertisement may be used.

In addition, before the advertisement (for example, streaming or a video file and/or an image file) in the content including the advertisement to be received (or which has been received) is transmitted to the portable apparatus 200, the controller of the display apparatus 100 may be configured to determine whether to transmit the advertisement to the portable apparatus 200 using the stored user information. The controller of the display apparatus 100 may be configured to determine whether the portable apparatus 200 may reproduce the video file and/or the image file corresponding to the advertisement using stored user information. For example, the user authentication of the video file and/or the image file or biological information of the user corresponding to the advertisement may be used.

When the content including the advertisement is reproduced separately, the time delay (which is, for example, about 5 sec or less and changeable) between the content output in the screen of the display apparatus 100 and the advertisement output in the screen of the portable apparatus 200 may be caused. When the content including the advertisement is reproduced separately, the time delay (which is, for example, about 5 sec or less and changeable) between the content output in the screen of the display apparatus 100 and the advertisement transmission to the portable apparatus 200 may be caused.

The controller of the display apparatus 100 may be configured to change a start time of advertisement transmission to the portable apparatus 200 based on the time delay. The controller of the display apparatus 100 may be configured to control the content output start time in the screen of the display apparatus 100 and the advertisement output start time in the screen of the portable apparatus 200 based on the time delay. For example, the controller of the display apparatus 100 may be configured to control the time delay between a content output start time in the screen of the display apparatus 100 and an advertisement output start time in the screen of the portable apparatus 200 to 500 ms or less (for example, may control a start time of transmission of the advertisement to the portable apparatus 200).

The controller 210 of the portable apparatus 200 may be configured to receive the advertisement transmitted from the display apparatus 100 through the communicator. The controller 210 of the portable apparatus 200 may store the advertisement received through the communicator in the storage 275.

The controller 210 of the portable apparatus 200 may be configured to execute an application (for example, a video player) corresponding to the received advertisement to display (or output) the advertisement on the screen of the portable apparatus 200. In addition, the controller 210 of the portable apparatus 200 may be configured to display (or output) the advertisement on (or to) a pop-up play screen having a smaller size than a screen of the portable apparatus 200 (for example, a size less than or equal to about 70% of the screen size of the portable apparatus 200).

When the advertisement reproduction is completed in the portable apparatus 200, the controller 210 of the portable apparatus 200 may be configured to notify the display apparatus 100 of the advertisement reproduction completion.

When the advertisement reproduction in the portable apparatus 200 is stopped by the user, the controller 210 of the portable apparatus 200 may be configured to notify the display apparatus 100 of the advertisement reproduction stop.

When the advertisement reproduction is completed in the portable apparatus 200, the controller of the portable apparatus 200 may be configured to transmit advertisement viewing information corresponding to whether the user views the advertisement and advertisement viewing duration to the display apparatus 100. The controller of the display apparatus 100 may be configured to analyze an advertisement viewing pattern and/or advertising effect of the user using the received advertisement viewing information. The controller of the display apparatus 100 may be configured to transmit the received advertisement viewing information to the server (not illustrated).

When the user stops the advertisement reproduction in the portable apparatus 200, the controller of the portable apparatus 200 may be configured to transmit stop advertisement viewing information corresponding to whether the user has completed advertisement viewing and advertisement viewing duration until an advertisement stop time to the display apparatus 100. The controller of the display apparatus 100 may be configured to analyze the advertisement viewing pattern and/or the advertising effect of the user using the received stop viewing information. The controller of the display apparatus 100 may be configured to transmit the received stop advertisement viewing information to the server (not illustrated).

When the content reproduction time is longer than the advertisement reproduction time (for example, about 30 sec), the controller of the display apparatus 100 may be configured to output content to the screen for a reproduction time even when the advertisement reproduction is completed.

The controller 210 of the display apparatus 100 may be configured to provide the user with the feedback corresponding to the separate reproduction of the content and advertisement. The feedback provided from the display apparatus 100 may be provided as one of visual, auditory, and tactile feedback to the user. The controller of the display apparatus 100 may be configured to provide one of the visual, auditory, and tactile feedback and a combination of the visual, auditory, and tactile feedback to the user through a wearable apparatus serving as the portable apparatus 200.

As a visual effect corresponding to separate reproduction of the content and advertisement (for example, a separate image or an animation effect such as a fade effect applied to a separate image, the visual feedback may be displayed to be distinguished from an object displayed on the screen. As a sound corresponding to the separate reproduction of the content and advertisement, the auditory feedback may be output from the speaker 263. The tactile feedback may be output from a vibration motor (not illustrated) in correspondence with the separate reproduction of the content and advertisement.

In the environmental setting (not illustrated) of the display apparatus 100, the feedback (for example, at least one of the visual, auditory, and tactile feedback) corresponding to the separate reproduction of the content and advertisement may be selected and/or changed.

The user may input and/or change a feedback providing time (which is, for example, about 300 ms and changeable) in which at least one type of feedback is provided to the user.

Figure 7:
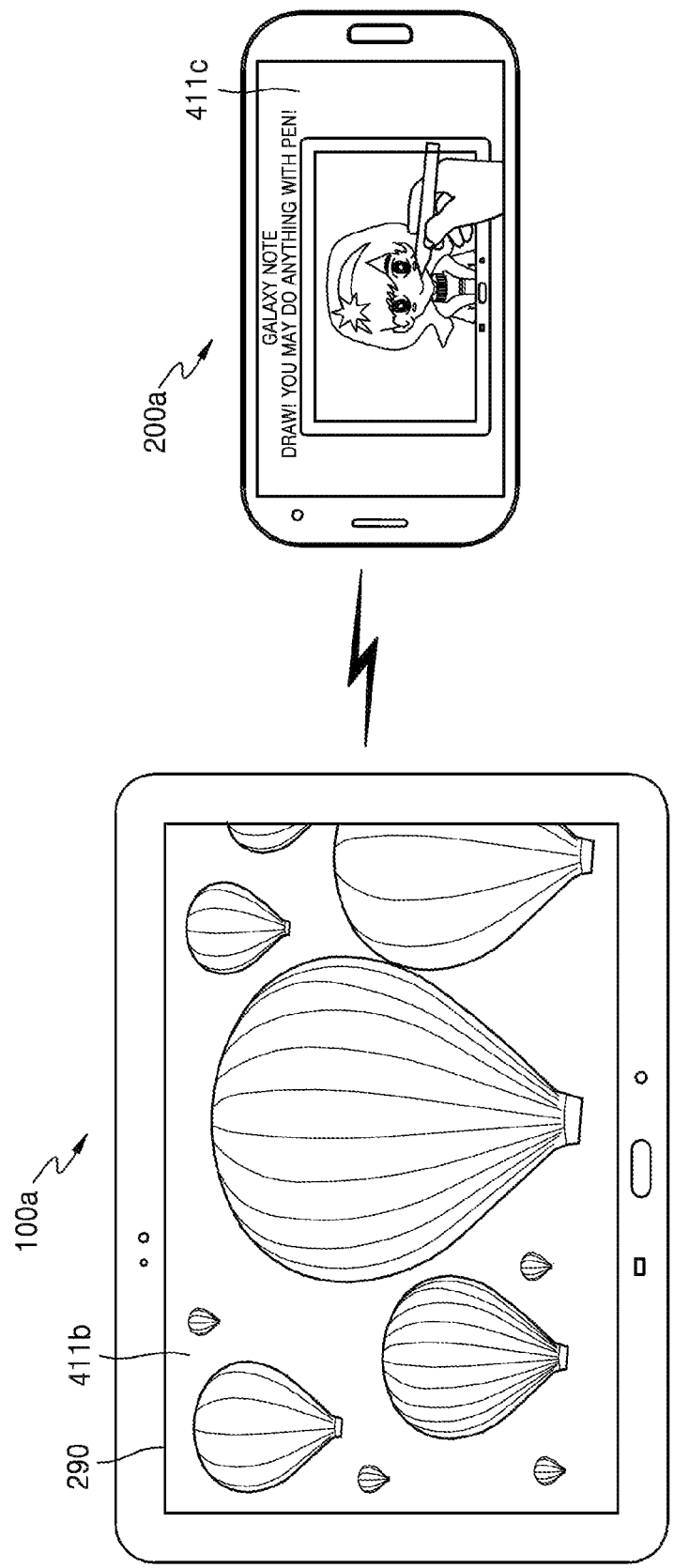
FIG. 7 is a diagram illustrating an example of a method of controlling a content output of a display apparatus.

FIG. 7 is a diagram illustrating an example of a method of controlling a content output of a display apparatus.

Referring to FIG. 7, a tablet apparatus 100a and a portable apparatus 200a in FIG. 7 may correspond to the display apparatus 100 and the portable apparatus 200 in FIGS. 4A to 4C, respectively. Because the separate reproduction of content and an advertisement in the tablet apparatus 100a and the portable apparatus 200a in FIG. 7 is substantially similar to that of the content and advertisement in the display apparatus 100 and the portable apparatus 200 in FIGS. 4A to 4C, redundant description thereof will be omitted.

When the content and advertisement are separately reproduced in step S360 of FIG. 3, the method of controlling the content output of the display apparatus ends.

Returning to step S350 of FIG. 3, the process proceeds to step S370 of FIG. 3 when the content does not include the advertisement.

In step S370 of FIG. 3, the display apparatus outputs the content.

When the received content does not include the advertisement, the controller of the display apparatus 100 may be configured to perform the output (for example, streaming) of the received content to the screen of the display apparatus 100. When the reception of content which does not include the advertisement is completed, the controller of the display apparatus 100 may be configured to output the received content to the screen of the display apparatus 100.

In step S370 of FIG. 3, the method of controlling the content output of the display apparatus ends when the display apparatus 100 outputs the content.

The examples may be implemented as program commands which may be performed by various kinds of computers, processors, processing circuitry or the like, and be recorded on a computer-readable recording medium. The computer-readable recording medium may include program commands, data files, data structures, and so on, solely or in combination. For example, any such software may be stored in a volatile or non-volatile storage device such as a ROM, or in a memory such as a RAM, a memory chip, a memory device or a memory integrated circuit, or in a storage medium, such as a compact disc (CD), a digital versatile disc (DVD), a magnetic disk or a magnetic tape, which is optically or magnetically recordable and simultaneously readable by a machine (e.g., a computer), regardless of whether the software may be deleted or rewritten. It will be appreciated that the memory which may be included in the mobile terminal is an example of a machine-readable storage medium suitable for storing a program or programs including instructions for implementing the examples of the disclosure. The program commands recorded on the medium may be specially designed or configured for the disclosure or well-known and available to persons skilled in the computer software art.

It should be understood that examples described herein should be considered in a descriptive sense only and not for purposes of limitation. Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope as defined by the following claims.

What is claimed is:

1. A method of controlling a content output of a display apparatus, comprising:
   receiving a selection of a symbol on a screen of the display apparatus;
   receiving content corresponding to the symbol and a pre-roll advertisement which is displayed before the content is reproduced;
   determining whether to transmit the pre-roll advertisement to an external apparatus based on settings of the display apparatus;
   in response to a first value of the settings of the display apparatus, outputting the content other than the pre-roll advertisement on the screen of the display apparatus and transmitting the pre-roll advertisement to the external apparatus; and
   in response to a second value of the settings of the display apparatus, outputting the content and the pre-roll advertisement on the screen of the display apparatus, wherein the pre-roll advertisement is displayed before the content is reproduced on the screen of the display apparatus.

2. The method of claim 1, further comprising:
   setting an advertisement output of the display apparatus corresponding to transmitting the advertisement from the display apparatus to the external apparatus.

3. The method of claim 1, further receiving at least one of: a mid-roll advertisement, a post-roll advertisement, and an app launch roll advertisement.

4. The method of claim 3, wherein the content is received in a transport stream packet through communication circuitry.

5. The method of claim 4, further comprising determining whether the pre-roll advertisement is included in the content by analyzing an adaptation field of a transport stream packet.

6. The method of claim 5, wherein, in the adaptation field, a flag corresponding to detection of the pre-roll advertisement and a flag corresponding to detection of the mid-roll advertisement are different from each other.

7. The method of claim 1, wherein, transmitting the pre-roll advertisement to the external apparatus further comprises determining whether to transmit the pre-roll advertisement to the external apparatus using one of pre-stored external apparatus information and user information.

8. The method of claim 1, wherein, in transmitting the pre-roll advertisement to the external apparatus, a time delay occurs between outputting of the content on the screen of the display apparatus and transmitting of the pre-roll advertisement to the external apparatus.

9. The method of claim 1, wherein, transmitting the pre-roll advertisement to the external apparatus comprises:
   determining a start time of transmitting of the pre-roll advertisement to the external apparatus based on a content reproduction start time on the screen of the display apparatus and an advertisement reproduction start time on a screen of the external apparatus.

10. The method of claim 1, wherein the content is continuously reproduced on the screen of the display apparatus and reproduction of the pre-roll advertisement is completed in the external apparatus when a reproduction time of the content is longer than a reproduction time of the pre-roll advertisement.

11. The method of claim 1, wherein at least one of visual feedback and an auditory feedback is provided in response to transmitting the pre-roll advertisement from the display apparatus to the external apparatus.

12. A display apparatus comprising:
   a display;
   communication circuitry; and
   a controller configured to control the display and the communication circuitry,
   wherein the controller is connected to a external apparatus using the communication circuitry, the controller being configured:
      to receive content corresponding to a symbol selected on the display and a pre-roll advertisement which is displayed before the content is reproduced, using the communication circuitry;
      to determine whether to transmit the pre-roll advertisement to the external apparatus based on settings of the display apparatus;
      in response to a first value of the settings of the display apparatus, to output the content other than the pre-roll advertisement on the screen of the display apparatus and transmitting the pre-roll advertisement to the external apparatus; and
      in response to a second value of the settings of the display apparatus, to output the content and the pre-roll advertisement on the screen of the display apparatus, wherein the pre-roll advertisement is displayed before the content is reproduced on the screen of the display apparatus.

13. The display apparatus according to claim 12, wherein the controller is configured to receive the content including the pre-roll advertisement in a transport stream packet using the communication circuitry.

14. The display apparatus according to claim 12, wherein the controller is configured to receive the content including the pre-roll advertisement using the communication circuitry in a first communication scheme and to transmit the pre-roll advertisement to the external apparatus using the communication circuitry in a second communication scheme.

15. The display apparatus according to claim 12, wherein the controller is configured to determine a start time of the transmission of the pre-roll advertisement to the external apparatus based on a content reproduction start time on the screen of the display apparatus and an advertisement reproduction start time on a screen of the external apparatus.

16. The display apparatus according to claim 12, wherein the controller is configured to determine whether to transmit the pre-roll advertisement to the external apparatus using one of stored external apparatus information and user information.

\* \* \* \* \*